(12) United States Patent
Martinez Lopez et al.

(10) Patent No.: US 12,520,391 B2
(45) Date of Patent: *Jan. 6, 2026

(54) SYSTEMS AND METHODS FOR MAPPING HEAT DEPOSITION IN A COOKING APPLIANCE THROUGH FAST PATTERN TEMPERATURE IMAGING

(71) Applicant: Samsung Electronics Company, Ltd., Suwon-si (KR)

(72) Inventors: Pedro Martinez Lopez, Mountain View, CA (US); Santiago Ortega Avila, Milpitas, CA (US); Brian R. Patton, San Francisco, CA (US); Nigel A. Clarke, Mountain View, CA (US); Ian David Parker, Santa Barbara, CA (US); Sergio Perdices-Gonzalez, Sunnyvale, CA (US); Sajid Hassan Sadi, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 863 days.

This patent is subject to a terminal disclaimer.

(21) Appl. No.: 17/680,104

(22) Filed: Feb. 24, 2022

(65) Prior Publication Data

US 2023/0269840 A1  Aug. 24, 2023

(51) Int. Cl.
*H05B 6/64* (2006.01)
*H05B 6/68* (2006.01)

(52) U.S. Cl.
CPC ............ *H05B 6/687* (2013.01); *H05B 6/645* (2013.01); *H05B 6/68* (2013.01)

(58) Field of Classification Search
CPC .......... H05B 6/687; H05B 6/645; H05B 6/68; H05B 6/705

(Continued)

(56) References Cited

U.S. PATENT DOCUMENTS 9,414,444 B2   8/2016   Libman
9,807,823 B2   10/2017  Einziger
(Continued)

FOREIGN PATENT DOCUMENTS

CN   106664753   5/2017
CN   109727657   1/2019
(Continued)

OTHER PUBLICATIONS

Stuart Johnsen et al , "Microwave Oven with a Thermal Camera: Solving the Cold Spot Problem". 2015, pp. 1-7, downaloded from chrome-extension://efaidnbmnnnibpcajpcglclefindmkaj/https://my.ece.utah.edu/~kstevens/3992/reports/thermal-microwave.pdf (Year: 2015).*

(Continued)

*Primary Examiner* — Robert E Fennema
*Assistant Examiner* — Olvin Lopez Alvarez

(57) ABSTRACT

In one embodiment, a method includes, by an electromagnetic device, generating an initial map of a temperature profile of a load disposed inside a cavity, emitting electromagnetic radiation into the cavity based on initial control parameter configurations, where a change in temperature of the load during the emission is measured by one or more sensors, generating updated maps of electromagnetic energy absorbed by the load based on the measured change in temperature of the load, where the updated maps comprise an indication of a spatial heating rate within the load, determining a sufficient number of the updated maps of electromagnetic energy absorbed by the load disposed inside the cavity have been measured, and, in response to determining that a sufficient number of the one or more updated maps of electromagnetic energy have been measured, storing the updated maps of electromagnetic energy absorbed by the load.

20 Claims, 16 Drawing Sheets

(58) Field of Classification Search
USPC .......................................................... 700/31
See application file for complete search history.

(56) References Cited

U.S. PATENT DOCUMENTS

| | | | |
|---|---|---|---|
| 10,223,933 B1 | 3/2019 | Cheng | |
| 10,268,919 B1 | 4/2019 | Piekniewski | |
| 10,819,905 B1 | 10/2020 | Liu | |
| 11,774,105 B2* | 10/2023 | Chase | H05B 6/6447 |
| | | | 219/707 |
| 2009/0321427 A1 | 12/2009 | Hyde | |
| 2009/0321428 A1 | 12/2009 | Hyde | |
| 2010/0187224 A1* | 7/2010 | Hyde | H05B 6/6455 |
| | | | 219/720 |
| 2013/0269539 A1 | 10/2013 | Polt | |
| 2013/0306627 A1 | 11/2013 | Libman | |
| 2015/0289324 A1 | 10/2015 | Rober et al. | |
| 2015/0366219 A1 | 12/2015 | Wersborg | |
| 2016/0029441 A1 | 1/2016 | Taylor | |
| 2016/0073453 A1 | 3/2016 | Hyde | |
| 2016/0192446 A1 | 6/2016 | Seddik | |
| 2016/0309548 A1 | 10/2016 | Libman | |
| 2017/0074522 A1* | 3/2017 | Cheng | F24C 7/085 |
| 2019/0116634 A1 | 4/2019 | Eadan | |
| 2019/0254127 A1 | 8/2019 | Ma | |
| 2019/0320507 A1 | 10/2019 | Guatta | |
| 2020/0187709 A1 | 6/2020 | Ayre | |
| 2020/0367692 A1* | 11/2020 | Stipe | G06V 20/52 |
| 2021/0145212 A1 | 5/2021 | Wang | |
| 2021/0267027 A1 | 8/2021 | Uno | |
| 2021/0307135 A1 | 9/2021 | Hooker | |
| 2021/0385917 A1 | 12/2021 | Kuchler | |
| 2021/0386239 A1 | 12/2021 | Eiter | |
| 2022/0141928 A1* | 5/2022 | Hong | H05B 6/72 |
| | | | 219/702 |
| 2022/0264709 A1 | 8/2022 | Zoellner | |
| 2022/0377856 A1 | 11/2022 | Patton | |

FOREIGN PATENT DOCUMENTS

| | | | | |
|---|---|---|---|---|
| CN | 110298902 A | * | 10/2019 | ........... A61B 5/0059 |
| JP | H06229557 | | 8/1994 | |
| JP | 2001201057 A | | 7/2001 | |
| JP | 2001317742 A | | 11/2001 | |
| JP | 2002115850 | | 4/2002 | |
| JP | 2004095501 A | | 3/2004 | |
| JP | 3672767 B2 | | 7/2005 | |
| JP | 2005315487 | | 11/2005 | |
| JP | 2015220189 | | 12/2015 | |
| JP | 2016-110750 A | | 6/2016 | |
| JP | 2019070462 | | 5/2019 | |
| KR | 19990065353 A | | 8/1999 | |
| KR | 10-0416286 B1 | | 1/2004 | |
| KR | 2019-0069624 A | | 6/2019 | |
| KR | 2021-0029722 A | | 3/2021 | |

OTHER PUBLICATIONS

PCT Search Report and Written Opinion in PCT/KR2023/095007, Jun. 14, 2023.
Miele Dialog Oven: https://www.cnet.com/reviews/miele-dialog-oven-preview/, 16 pages.
GOJI Food Solutions: http://www.gojifoodsolutions.com/rf-cooking-technology , 9 pages.
June Oven: https://juneoven.com/pages/smart-oven , 26 pages.
Combustion Inc. Predictive Probe: https://combustion.inc/, 17 pages.
Khan, Tareq, "An Intelligent Microwave Oven with Thermal Imaging and Temperature Recommendation Using Deep Learning," Applied System Innovation, 2020 3, 13,doi: 10.3390/asi3010013, Accepted Feb. 13, 2020, Published: Feb. 17, 2020, www.mdpi.com/journal/asi, 17 pages.
"NNLC: Non-Negative Least Chi-square minimization and application to HPGe detectors," by Pierre D'esesquelles et al.; Cornell University, Journey Ref: J.Phys.G36:037001,2009, 8 pages, Feb. 22, 2009.
"Software-Defined Cooking using a Microwave Oven", by Haojian Jin et al.; Carnegie Mellon University, Pittsburgh, PA, US, 16 pages, 2019.
"Solving Least Squares Problems," by Charles L. Lawson et al, Society for Industrial and Applied Mathematics, Philadelphia. Chapter 23 pp. 158-173, 1995.
Non-Final Office Action in U.S. Appl. No. 17/707,561, 15 pages, Dec. 20, 2024.
Final Office Action in U.S. Appl. No. 17/707,561, 17 pages, Mar. 6, 2025.
Heat Map Microwave—a New invention; Mark Rober https://youtu.be/ptkzzNaZb7U, 1 page, Feb. 11, 2015.
PCT Search Report and Written Opinion in Application No. PCT/KR2022/006554, 9 pages, Aug. 10, 2022.
Non-Final Office Action in U.S. Appl. No. 17/316,497, 33 pages, Jun. 29, 2023.
Final Office Action in U.S. Appl. No. 17/316,497, 39 pages, Mar. 21, 2024.
Non-final Office Action in U.S. Appl. No. 17/316,497, 45 pages, Sep. 6, 2024.
Final Office Action in U.S. Appl. No. 17/316,497, 41 pages, Jan. 16, 2025.
European Patent Office Extended European Search Report in application No. 23760451.7-1002 / 4388821 PCT/KR2023095007, 9 pages, Nov. 8, 2024.
Notice of Allowance in U.S. Appl. No. 17/316,497, May 23, 2025.
Notice of Allowance in U.S. Appl. No. 17/707,561, Apr. 25, 2025.

* cited by examiner $$PSNR = \frac{Max_{Load}}{Std_{Background}}$$

SYSTEMS AND METHODS FOR MAPPING HEAT DEPOSITION IN A COOKING APPLIANCE THROUGH FAST PATTERN TEMPERATURE IMAGING

TECHNICAL FIELD

This disclosure relates generally to cooking appliances, and more particularly to temperature profile control of microwave ovens and other cooking devices.

BACKGROUND

Conventional cooking appliances typically heat food unevenly, often resulting in unsatisfactory food quality (e.g., regions either too hot or too cold), excessive user intervention, potential degradation of the food being heated, minor accidents (e.g., unwanted boiling or spattering due to overheating), slow heating times (e.g., on/off power cycling to even out temperatures), and so forth. Additionally, many conventional microwave ovens may require the user to input a heating time duration in order to achieve a desired food temperature. Such a process may be fraught with uncertainty and may often be made more complex for users due to the cumbersome user interface options for entering the heating time durations. It may be thus useful to provide techniques to improve microwave oven devices.

DESCRIPTION OF EXAMPLE EMBODIMENTS

Figure 1:
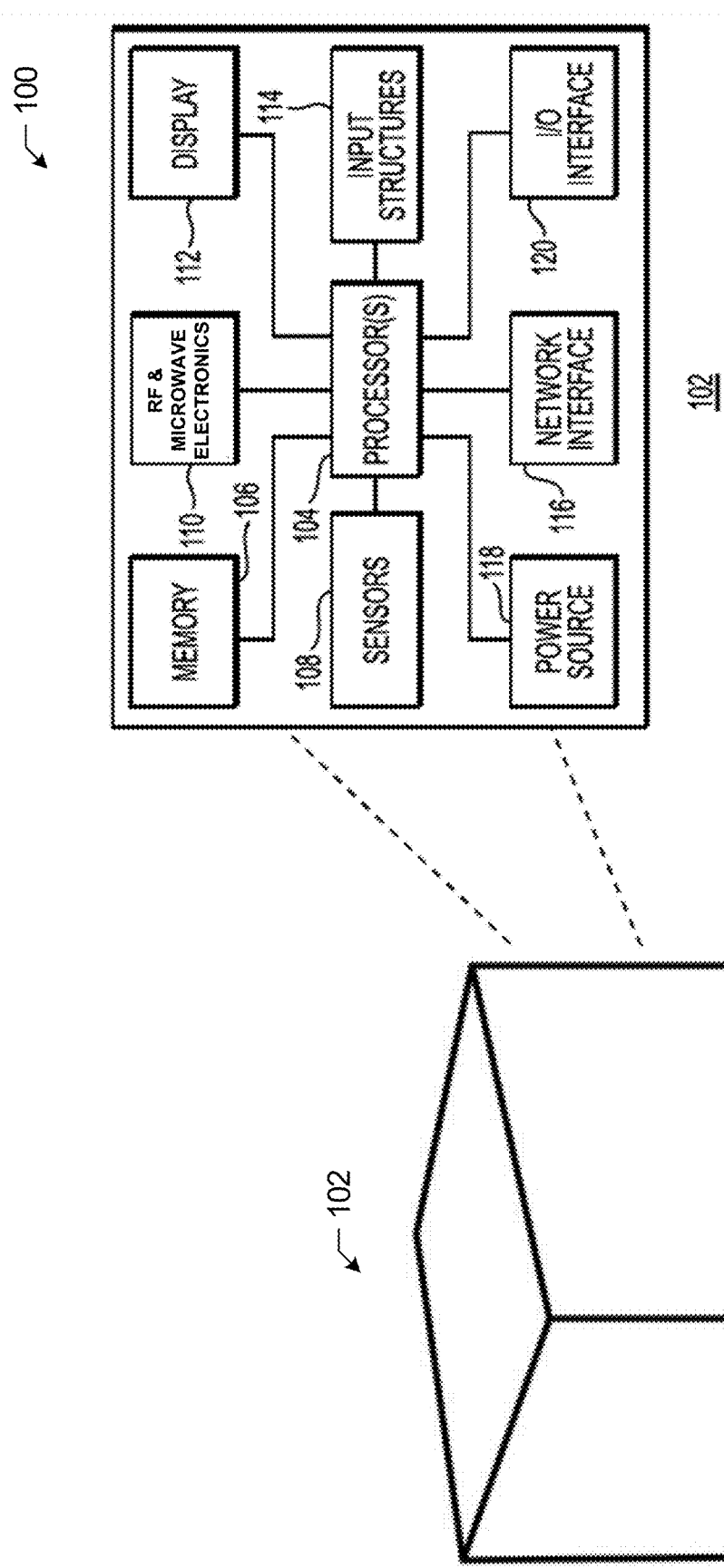
FIG. 1 illustrates an example diagram of a cooking appliance.

FIG. 1 illustrates an example diagram 100 of a cooking appliance 102. In particular embodiments, cooking appliance 102 may include a temperature profile-based electromagnetic cooking appliance 102. In particular embodiments, a cooking appliance 102 may measure the pattern of electromagnetic energy absorbed by a load disposed inside a cavity when electromagnetic radiation is directed into the cavity. As used herein, "cavity" may be defined as an area in which food may cook within a cooking appliance 102. As an example and not by way of limitation, toasting slots within a toaster to cook toast may be defined as a cavity. As another example and not by way of limitation, the cooking chamber within a microwave oven may be defined as a cavity. In particular embodiments, the cooking appliance 102 may include, for example, any of various cooking appliances 102 that may be suitable for heating or warming food, or otherwise directing electromagnetic energy to one or more loads disposed inside a cavity of the cooking appliance 102. In particular embodiments, as further depicted by FIG. 1, the cooking appliance 102 may include, among other things, one or more processor(s) 104, memory 106, sensors 108, radio frequency (RF) and microwave electronics 110, a display panel 112, input structures 114, network interfaces 116, a power source 118, and an input/output (I/O) interface 120. It should be noted that FIG. 1 is merely one example of a particular implementation and is intended to illustrate the types of components that may be included as part of the cooking appliance 102.

In particular embodiments, the one or more processor(s) 104 may be operably coupled with the memory 106 to perform various algorithms for providing a temperature profile-based cooking appliance. Such programs or instructions executed by the processor(s) 104 may be stored in any suitable article of manufacture that includes one or more tangible, computer-readable media at least collectively storing the instructions or routines, such as the memory 106. The memory 106 may include any suitable articles of manufacture for storing data and executable instructions, such as random-access memory (RAM), read-only memory (ROM), rewritable flash memory, hard drives, and so forth. Also, programs (e.g., an operating system) encoded on such a computer program product may also include instructions that may be executed by the processor(s) 104 to enable the cooking appliance 102 to provide various functionalities.

In particular embodiments, the sensors 108 may include, for example, one or more cameras (e.g., depth cameras), touch sensors, microphones, motion detection sensors, thermal detection sensors, light detection sensors, time of flight (ToF) sensors, ultrasonic sensors, infrared sensors, or other similar sensors that may be utilized to detect the physical state of the load (e.g., its temperature profile) or various user inputs (e.g., user voice inputs, user gesture inputs, user touch inputs, user instrument inputs, user motion inputs, and so forth). The RF and microwave electronics 110 may include, for example, any number of magnetrons, power amplifiers, signal generators, waveguides, antennas, integrated circuits, transistors, solid-state amplifiers, and/or one or more other devices that may be collectively suitable for directing electromagnetic energy (e.g., microwave energy) to a load (e.g., food, solids, liquids, and so forth) that may be disposed inside a cavity of the cooking appliance 102. The display panel 112 may include any display architecture (e.g., AMLCD, AMOLED, micro-LED, and so forth), which may provide further means by which users may interact and engage with the cooking appliance 102.

In particular embodiments, the input structures 114 may include any physical structures utilized to control one or more global functions of the cooking appliance 102 (e.g., pressing a button to power "ON" or power "OFF" the cooking appliance 102). The network interface 116 may include, for example, any number of network interfaces suitable for allowing the cooking appliance 102 to access and receive data over one or more cloud-based networks (e.g., a cloud-based service that may service hundreds or thousands of the cooking appliance 102 and the associated users corresponding thereto) and/or distributed networks. The power source 118 may include any suitable source of power, such as a rechargeable lithium polymer (Li-poly) battery and/or an alternating current (AC) power converter that may be utilized to power and/or charge the cooking appliance 102 for operation. Similarly, the I/O interface 120 may be provided to allow the cooking appliance 102 to interface with various other electronic or computing devices, such as one or more auxiliary electronic devices.

Inhomogeneous heating is an intrinsic property of heating within a multimode radiofrequency cavity (e.g., cooking appliance 102) due to the standing-wave pattern that is established by the reflective walls. The electromagnetic wave equation as defined below may apply to RF heating scenarios, and more specifically "multimode" cavities, wherein the cavity dimensions are larger than the RF wavelength. Within a source-free medium such as air or food, the RF radiation obeys the electromagnetic wave equation:

$$\nabla \times \left(\frac{1}{\mu}\right) \nabla \times E - \omega^2 \epsilon E = 0 \quad \text{(Equation 1)}$$

$$\nabla^2 E + \omega^2 \epsilon \mu E = 0 \quad \text{(Equation 2)}$$

In Equation 1 and Equation 2, E represents the complex vector electric field, μ represents the complex magnetic permeability of the material, E represents the complex dielectric permittivity of the material, and co represents the angular frequency of the wave. Incident RF radiation may reflect off the electrically conducting oven walls, setting up a stationary standing wave pattern of constructive and destructive interference. Certain commercial cooking appliances 102 may operate with frequencies of 2400 megahertz (MHz) to 2500 MHz, resulting in a wavelength of 12 centimeters (cm). An empty commercial cooking appliance will tend to have a semi-regular pattern of standing wave nodes and anti-nodes separated by approximately half this length, or 6 cm. The RF wavelength may be smaller in dielectric materials, such as food. For example, food is heated by absorption of the electric field according to its electric and magnetic properties:

$$\epsilon = \epsilon_0(\epsilon' + i\epsilon'') \quad \text{(Equation 3)}$$

In Equation 3, $\epsilon'$ and $\epsilon''$ are real-valued (and generally frequency-dependent) parameters of the food, $\epsilon_0$ is a fundamental physical constant, and i is the imaginary unit. In the absence of magnetic dissipation, the power density P absorbed by the food may be calculated as:

$$P = \frac{1}{2}(\sigma + \epsilon_0 \epsilon'' \omega)|E|^2 \quad \text{(Equation 4)}$$

In Equation 4, σ is the electrical conductivity. In Equation 4, P is measured in watts per cubic meter. The power deposition in the food is proportional to the squared magnitude of the electric field, which is fundamentally inhomogeneous within the cavity due to the standing-wave pattern. In particular embodiments, inhomogeneity is made worse by the fact that the food fundamentally changes the standing-wave pattern within the cavity, meaning that the heating pattern may generally not be determined a priori. The standing-wave pattern is affected not only by the food dielectric characteristics, but also by its geometry and placement within the cavity. For example, if the load is placed on a rotating turntable within the cavity, the standing-wave pattern throughout the cavity will be modulated as the turntable rotates, and regions of high heating within the food will not remain fixed with respect to either the food or the cavity coordinate system. As the inherent standing wave pattern cannot be predicted beforehand due to being strongly influenced by the food, any closed-loop control of the food requires active measurements of where the heat is being deposited.

Inhomogeneous heating is also challenging with infrared (IR) radiant heating, used in broiling and toasting applications. The rate at which a food item heats not only depends on the placement and power of the radiant emitters within an appliance; it also depends on the infrared absorption coefficient of the food's surface, which may vary within the food itself. Further, evaporative cooling may strongly affect the surface heating rate of the load and may vary throughout the food due to inhomogeneity of the water content. Even with a multi-emitter system with independent control of each emitter's power, it may not be possible to achieve a controlled final temperature profile without some measurement of the spatially varying absorption rate within the food. The present embodiment is directed to a technique of taking prompt measurements of spatially varying heating within a cooking appliance for various control parameter combinations, thus allowing the system to quickly correlate heating patterns with control parameters and subsequently heat the food to a desired temperature profile. The degree of heating during the measurements of spatially varying heating may be adaptively tailored to ensure a sufficient signal-to-noise ratio without overheating the food. Further, the ambient environmental temperature within the cavity of the cooking appliance may be taken into account in order to correct recorded heating maps for temperature dependent cooling.

In particular embodiments, in cooking appliances 102, the microwave energy may be generated by a magnetron (e.g., an analog high-power vacuum tube device that emits radiofrequency waves by resonant oscillation). Though efficient and inexpensive, magnetrons generally have poor frequency and phase control and may not be driven at intermediate powers. The standard approach to power regulation in a commercial cooking appliance is to cycle the magnetron power on and off with variable duty cycle. This relies on thermal diffusion within the food to even out the temperature but may be an imprecise and slow technique that invariably results in overheating or underheating some regions within the load (e.g., food). A major drawback of this approach is that thermal diffusion in most foods is quite slow. The conductive heat diffusion equation within a substance is parameterized by its density $\rho$, specific heat $c_p$, and thermal conductivity k:

$$\rho c_p \frac{\partial T}{\partial t} = k\nabla^2 T \qquad \text{(Equation 5)}$$

This diffusion equation (e.g., Equation 5) relates the time derivative of the temperature at every point in the load to its Laplacian (derived from its spatial gradient). The combination $k/\rho c_p$ is the thermal diffusivity $\alpha$ of the substance, with units cm²/sec. The characteristic time $t_{diff}$ for heat to diffuse a length $\ell$ through the material is simplified as:

$$t_{diff} = \ell^2/2\alpha \qquad \text{(Equation 6)}$$

In particular embodiments, the thermal diffusivity of beef is reported in the literature to be $\alpha_{beef} \leq 0.0013$ cm²/s. If two regions within a plate of beef are separated by 1 cm and heated to different temperatures, it may be deduced that it will take approximately 385 seconds for the temperature to even out substantially. Thus, heat diffusion may be too slow to even out hotspots or cold-spots. For example, as previously determined through a power-cycled microwave heating experiment, the temperature of the food at the hot spot heats up dramatically when the emitter power is turned "ON", and then slowly falls while the emitter is "OFF". The temperature of the food at the cold spot is very slow to equilibrate.

In particular embodiments, cooking appliance 102 may have the ability to heat specific zones differently by controlling the power of individual heating elements placed throughout the cooking appliance 102. In principle, this may allow the user to specify a desired final temperature profile for the food placed in the cooking appliance 102, however, fully automated control may be difficult to achieve unless the cooking appliance 102 has knowledge of the spatial heating patterns associated with control parameters. This in turn requires spatial thermometry, which may be most critical when the heating patterns are non-uniform and difficult to predict in advance. Spatial thermometry may be most effective when a change in control parameters results in an immediate change in the heating pattern. These conditions may be met, for example, by radiofrequency (RF) cooking methods as well as broiling and toasting devices. The latter two cooking methods rely on heat via infrared radiation emitted by a set of elements and absorbed by the food's surface. However, inhomogeneities in the broiling and toasting process may arise from the uneven placement of heating elements, poorly controlled thermal losses from the appliance, variation in the food's color, variations in the food's water content, etc. RF cooking is fundamentally inhomogeneous within an enclosed cavity of the cooking appliance 102 due to the standing-wave pattern, and the electric field may not be predicted a priori because the electric field is strongly dependent on the shape, distribution, and dielectric properties of the object being heated. Without knowledge of where heat is being deposited within a food, predicting or controlling a final temperature of the food is generally not possible. Thus, it may be useful to provide techniques to steer heating energy by taking prompt measurements of spatially varying heat deposition over varying control parameters to achieve predictable, homogenous heating in a cooking appliance 102.

Figure 2B:
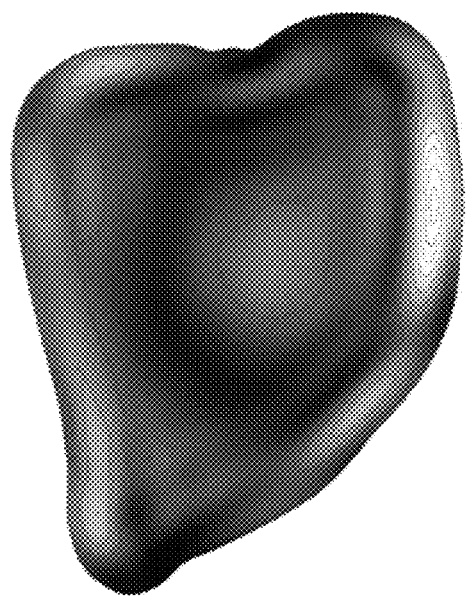
FIGS. 2A, 2B, 2C, and 2D illustrate example diagrams of a heating pattern within food being heated by absorption of RF energy in a microwave oven.
Figure 2D:
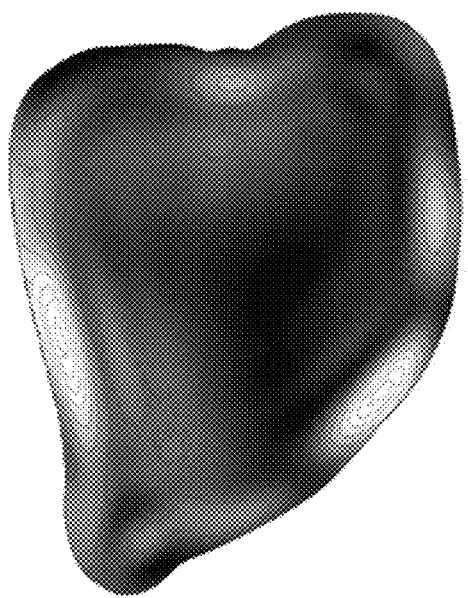
Figure 2A:
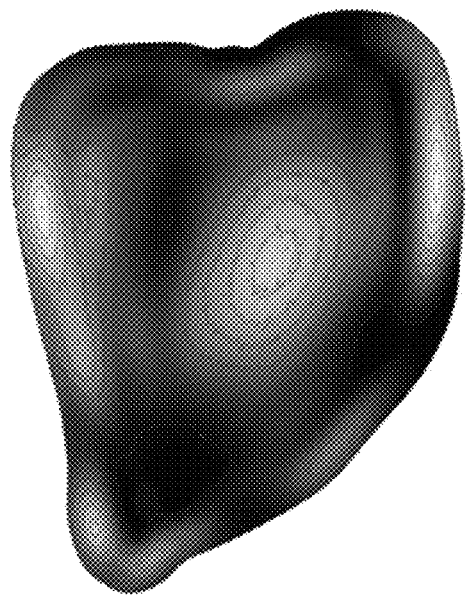
Figure 2C:
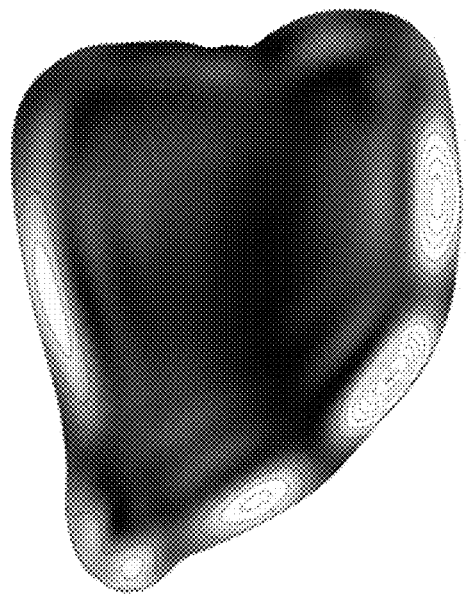

FIGS. 2A, 2B, 2C, and 2D illustrate example diagrams of a heating pattern within food being heated by absorption of RF energy in a microwave oven. For example, FIGS. 2A, 2B, 2C, and 2D illustrate that heating patterns within the food may be controlled either deterministically or non-deterministically through potential control parameters such as, variation of the cooking appliance 102 emitter frequency, power, and in the case of multi-emitter systems, relative phase among emitters; rotation or translation of the food; modification of the cavity geometry or electrical properties; and addition of refracting or reflecting elements (including so-called "mode stirrers") within the microwave propagation path. For example, FIGS. 2A, 2B, 2C, and 2D depict simulated heating patterns in a beef steak with realistic dielectric and thermal properties when the steak is irradiated with microwave energy in a multimode cavity. The simulated cavity has two emitters operating at the same frequency that is chosen to be 2.45 GHz (FIGS. 2A and 2B) or 2.50 GHz (FIGS. 2C and 2D), with relative electromagnetic phase of 0° (FIGS. 2A and 2C) or 90° (FIGS. 2B and 2D). Heating rates are plotted on a range of 0 W/cm³ to 2.5 W/cm³. Variation of the other parameters listed above result in qualitatively similar variations in the resulting heating patterns.

Figure 3:
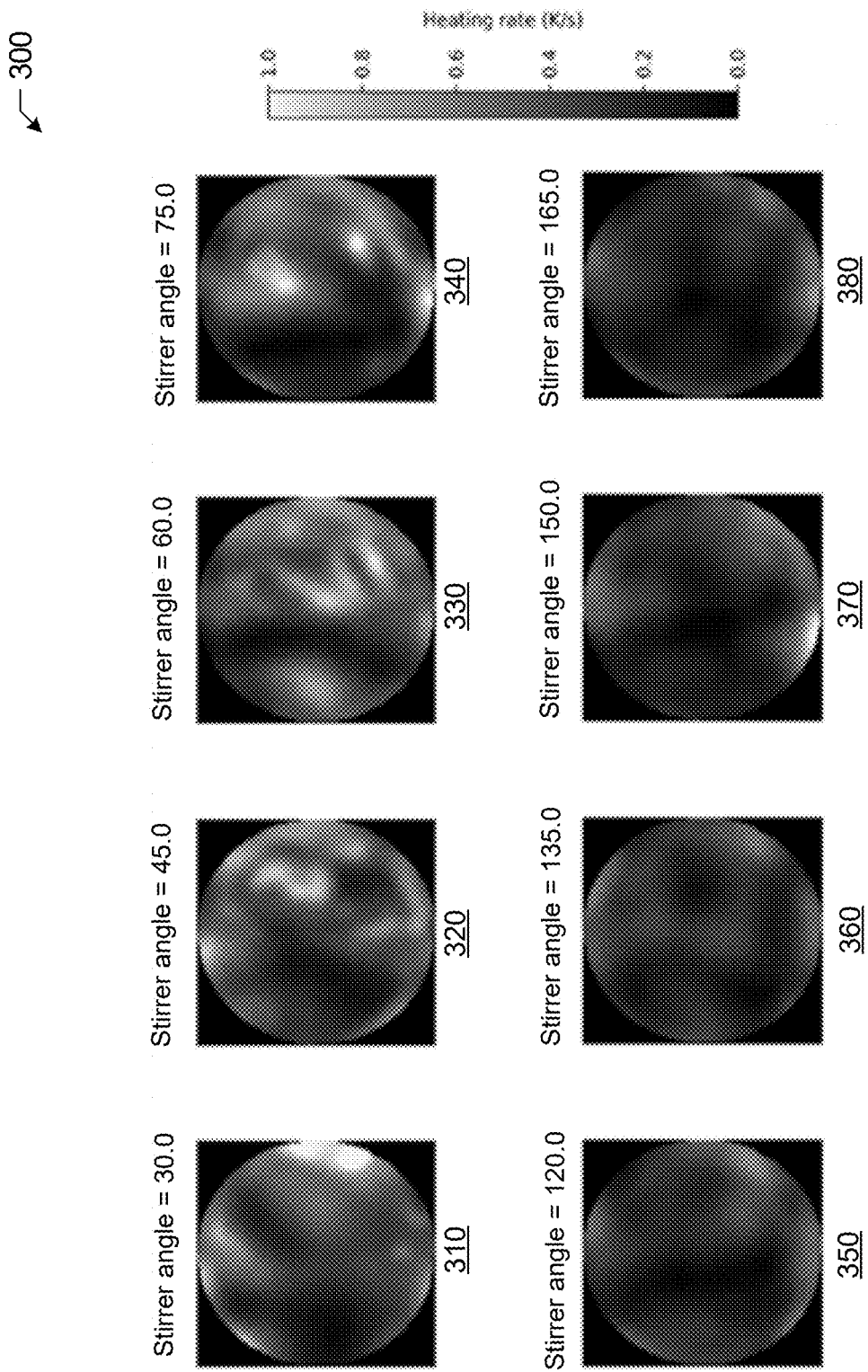
FIG. 3 illustrates an example diagram depicting sample heating patterns measured in a radiofrequency cooking appliance with a mode stirrer.

FIG. 3 illustrates an example diagram 300 depicting sample heating patterns measured in a radiofrequency cooking appliance 102 with a mode stirrer. In particular embodiments, to permit effective closed-loop temperature control to achieve a user's desired final temperature profile, the spatially dependent rate of heat deposition may be measured through Fast Pattern Temperature Imaging (FPTI) and/or Adaptive Fast Pattern Temperature Imaging (AFPTI). As an example and not by way of limitation, FPTI and/or AFPTI may measure spatially varying heat deposition via short-duration heating pulses and prompt spatial thermometry to detect small temperature increments in the object being heated, resulting in a two-dimensional image or heat map reflecting the heating rate in degrees per second. The techniques of Fast Pattern Temperature Imaging (FPTI) and/or Adaptive Fast Pattern Temperature Imaging (AFPTI) may utilize any sensors 108 that measure a spatial temperature profile of the load. As an example and not by way of limitation, infrared thermal imaging cameras may be placed outside the cavity of the microwave oven, thus shielded from microwave radiation and/or high temperatures. For example, the infrared thermal imaging cameras may measure the temperature profile of the food through a small aperture in the microwave cavity that permits optical access without allowing RF energy to escape the cavity.

For example, FIG. 3 illustrates sample heating patterns measured with FPTI and/or AFPTI for RF heating in a cavity of an electromagnetic device (e.g., cooking appliance 102). In FIG. 3, a mode stirrer within the cavity of the electromagnetic device may be repositioned to alter the standing-wave pattern, resulting in the heating maps as displayed in 310, 320, 330, 340, 350, 360, 370, and 380. As used herein, mode sitters may refer to a reflective or refractive element within the cavity of an electromagnetic device that alters the boundary conditions and thus the path that the RF rays follow. As an example and not by way of limitation, the angle at which the mode stirrer is positioned at within the cavity of an electromagnetic device may represent a control parameter.

As demonstrated in FIG. 3, the heating rates are plotted on a range of 0.0 K/s to 1.0 K/s. Heat map 310 demonstrates an example heating pattern when a mode stirrer is positioned at an angle of 30.0 degrees within the cavity of the electromagnetic device (e.g., cooking appliance 102). Heat map 320 demonstrates an example heating pattern when the mode stirrer is positioned at an angle of 45.0 degrees within the cavity of the electromagnetic device. Heat maps 330, 340, 350, 360, 370, and 380 demonstrate example heating patterns when the mode stirrer is positioned at an angle of 60.0 degrees, 75.0 degrees, 120.0 degrees, 135.0 degrees, 150.0 degrees, and 165.0 degrees, respectively.

In particular embodiments, selecting a sequence of mode stirrer angles may yield a user-specified final temperature profile, but only if the resulting heating patterns are known by the system. FTPI and/or AFPTI allow for measurement of heat spatial deposition within a load, resulting from each combination of the system control parameters. In appliances using radiofrequency heating, the control parameters may include the phase, frequency of the microwave source(s), power of the microwave source(s), position of the load (which may be rotated or translated), or the position or angle of the mode stirrer. Changes in one or more of the above-mentioned control parameters may yield differing standing-wave patterns. In particular embodiments, closed-loop control of particular control parameter combinations may result in a predictable temperature rise of a load disposed inside a cavity of an electromagnetic device (e.g., cooking appliance 102). Prompt measurements of spatially varying heat deposition for varying control parameter combinations through FPTI and/or AFPTI may generate intelligent heating algorithms, which are particularly valuable in electromagnetic devices, where heat deposition may be intrinsically inhomogeneous, rapid, and difficult to predict a priori. Although the present embodiments demonstrate FPTI and/or AFPTI via radiometric infrared thermal imaging, this disclosure contemplates any suitable sensor 108 technology that yields a prompt and spatially resolved temperature map. In particular embodiments, alternate sensors 108 may include a network of thermistors or thermocouples places near or within the load, such as an array of solid-state thermometers built into the turntable or tray of an electromagnetic cooking device.

Ideally, the process of recording a set of heating maps will be non-perturbative, or, in other words, will have little to no impact on the food while the FPTI and/or AFPTI process gains information about how the system control parameters affect the heating patterns of the food. In particular embodiments, FPTI and/or AFPTI may have little to no impact on the temperature of the object being imaged. As an example and not by way of limitation, a single FPTI and/or AFPTI pattern may be measured with a noise floor of 50 millikelvin (mK) using a thermal imaging camera with low-cost uncooled microbolometer IR sensors. In this example, for characteristic peak heating rates of 1 Kelvin per second (K/s), ten heating patterns may be measured each second with a signal-to-noise ratio greater than 1 and an overall load temperature rise of less than or equal to 1 Kelvin (K). The heat deposition rate may be calculated as:

$$\text{Heat deposition[Kelivn/second]} = \frac{\text{Temperature2} - \text{Temperature1}}{t_2 - t_1} \quad \text{(Equation 7)}$$

Equation 7, as demonstrated, is a spatially varying function throughout the load and on the surface of the load. If the heating patterns vary substantially as a function of the control parameters being varied, the overall temperature rise of the load may be slower than 1 K/s due to the "hot spot" of the directed heating moving throughout the food during the measurement process. In practice, the number of maps measured may be a function of the noise equivalent temperature difference (NETD) of the measurement device, the total time allowed for the FPTI and/or AFPTI measurement, and the maximum acceptable temperature rise.

As previously discussed, FPTI and/or AFPTI yield measurements of spatially dependent heating of an object arising from a given set of control parameters. This may allow for the prediction of a future temperature profile of the load based upon the current temperature profile of the load and the chosen control parameters for subsequent heating of the load. The result of the FPTI and/or AFPTI process may allow relatively precise control of the object's temperature profile by adjustment of one or more control parameters. Although the above descriptions of FPTI and/or AFPTI imply that individual heating patterns may be measured prior to the principal heating or cooking sequence, it is understood that knowledge of the heating patterns may be updated at any time the electromagnetic device (e.g., cooking appliance 102) applies heat with a known set of control parameters. In particular embodiments, it may be advantageous to update knowledge of the heating maps during the main heating sequence to obtain an optimal signal-to-noise ratio. Equation 7 may be rewritten as the following vector equation:

$$K(p_z) = \frac{T_2 - T_1}{t_2 - t_1} \quad \text{(Equation 8)}$$

In Equation 8, $T_1$ is the initial temperature map and $T_2$ is the final temperature map, each of which are represented as a two-dimensional vector of pixels $T_{ij}$. Similarly, K is represented as a two-dimensional vector of heating rates $K_{ij}$ depending on vector $p_z$, which describes the control parameter combinations (such as, for example, microwave frequency and/or the position of the mode stirrer) for the particular parameter combination z applied during the heating between times $t_1$ and $t_2$.

Figure 4:
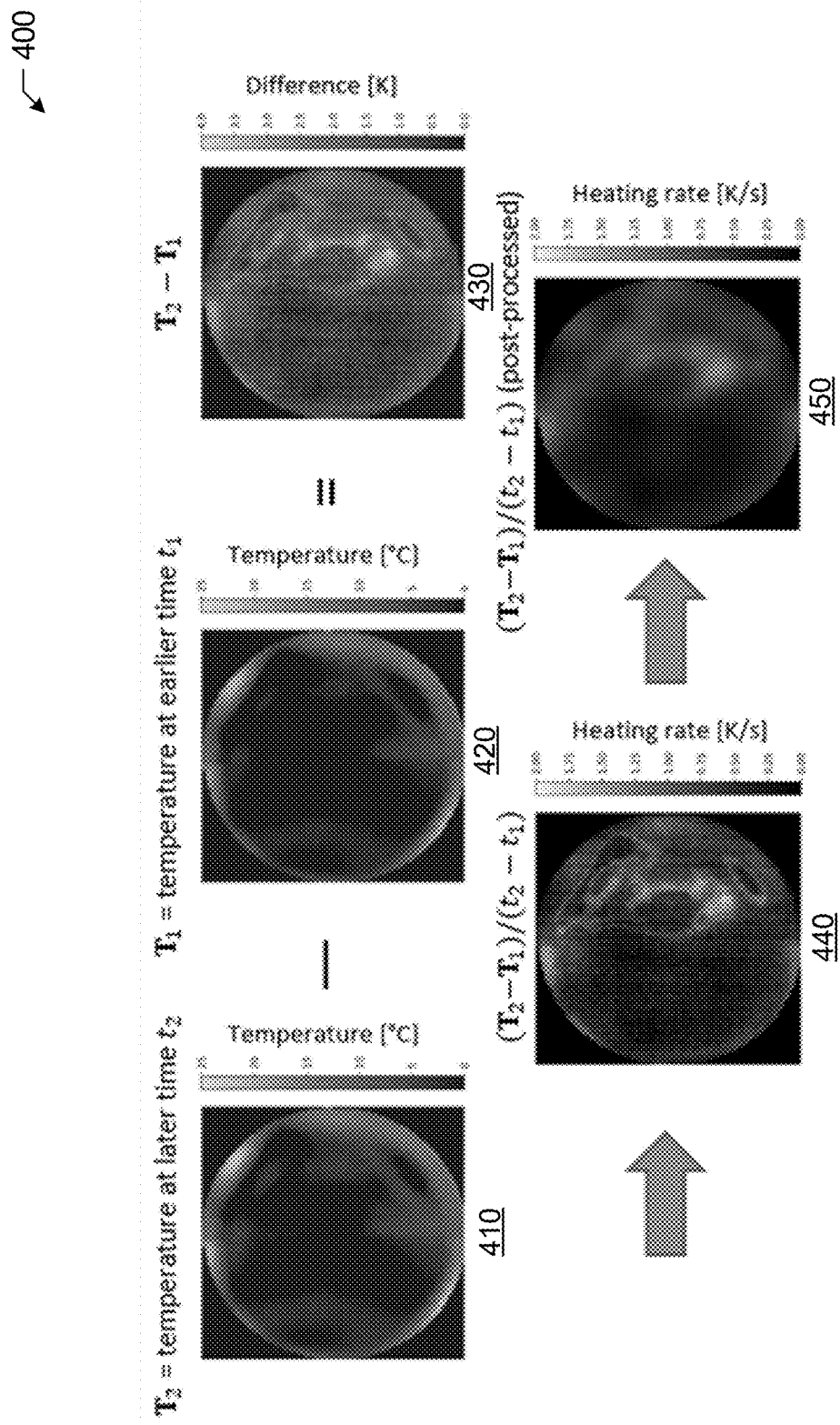
FIG. 4 illustrates an example diagram depicting heating maps.

FIG. 4 demonstrates example diagram 400 depicting heating maps. As an example and not by way of limitation, heat map 410 represents a temperature map $T_2$, where temperature was measured at a later time $t_2$. Heat map 410 may be plotted on a range of 0 to 25 degrees Celsius (° C.). In this example, heat map 420, representing a temperature map $T_1$, where temperature is measured at an earlier time $t_1$, may be subtracted from heat map 410, resulting in heat map 430. Heat map 430 represents a heat map difference $T_2-T_1$, wherein the difference in temperature is plotted on a range of 0.0 to 4.0 K. In this example, heat map 440 may represent a heat map reflecting the differential $$\frac{T_2 - T_1}{t_2 - t_1},$$

plotted on a range of 0.00 to 2.00 K/s. Finally, heat map 450 represents the FPTI heat map after performing optional post-processing steps to smooth, denoise, etc., plotted on a range of 0.00 to 2.00 K/s.

Figure 5:
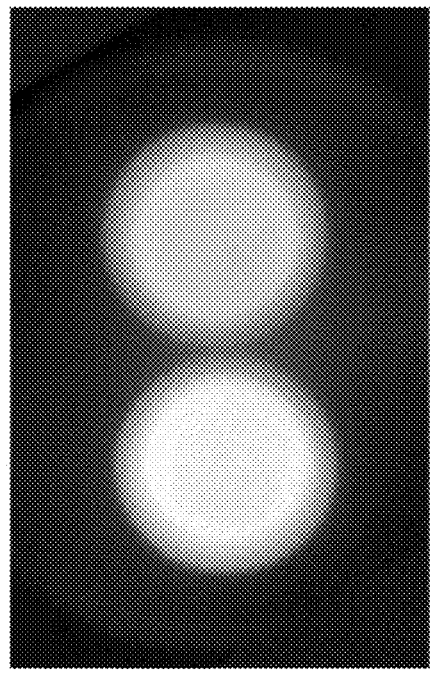
FIG. 5 illustrates example thermal images of two cups of liquid.
Figure 5:
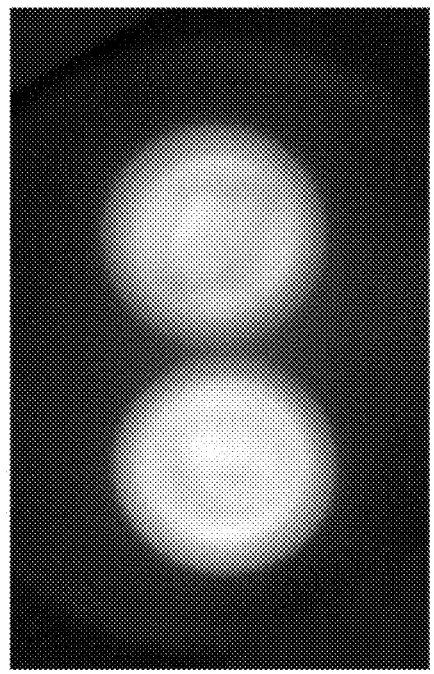

FIG. 5 demonstrates example thermal images 500 of two cups of liquid. Fast Pattern Temperature Imaging (FPTI) and/or Adaptive Fast Pattern Temperature Imaging (AFPTI) heat maps may reflect heating patterns generated in fluid loads, such as beverages being heated. As an example and not by way of limitation, in heat map 510, the thermal image displays two cups of water immediately after a heating pulse of electromagnetic energy and imaged by the technique of FPTI and/or AFPTI. As demonstrated in FIG. 5, thirty seconds after the heating pulse of heat map 510, heat map 520 demonstrates a thermal image of the two cups of water displaying temperature equilibrium due to convection. In particular embodiments, it may be necessary to wait for the liquid temperatures to reach equilibrium due to convection for some time after the application of the heating pulse, as shown in the example illustrated in heat map 520. In many non-viscous liquids, thermal convection within a liquid may tend to homogenize the overall temperature of the load over a timescale of several seconds following a heating pulse by FPTI and/or AFPTI. In particular embodiments, the subsequent temperature map $T_2$ may be measured some period of time after the end of the FPTI heating pulse, rather than during or immediately after the FPTI heating pulse, thus allowing the liquids to achieve temperature equilibration. For this reason, measuring the spatial profile of the temperature rise throughout the liquid may be unnecessary, as any FPTI and/or AFPTI measurement may indicate the net heating of the liquid load as a result of a particular control parameter combination. However, this information may still be useful as the net heating rate may vary as a function of the control parameters and achieving a desired final beverage temperature may benefit from the knowledge about the rate of temperature rise.

Figure 6:
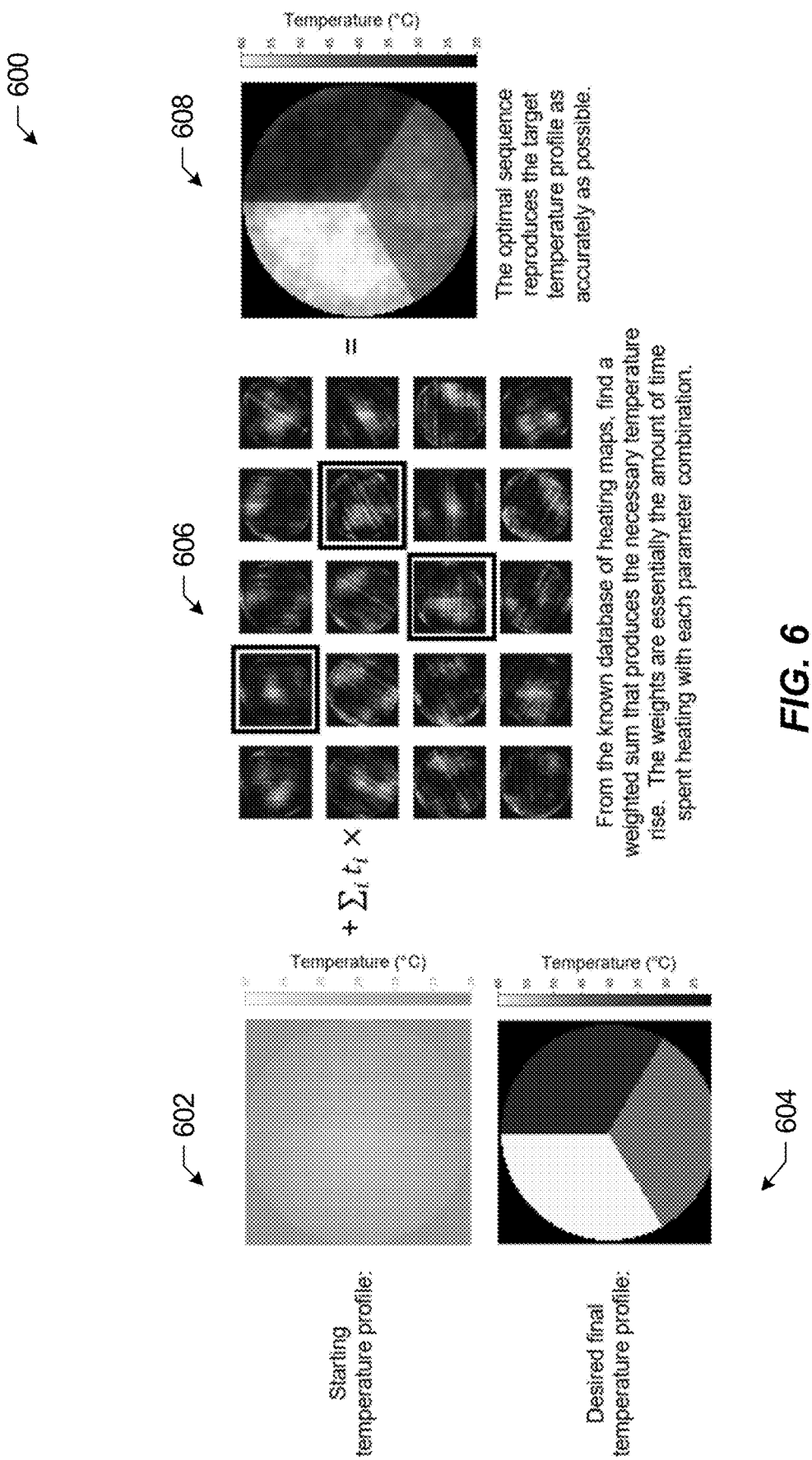
FIG. 6 illustrates an example diagram of calculating an optimal sequence of heating patterns to achieve a target temperature profile.

FIG. 6 illustrates an example diagram 600 of calculating an optimal sequence of heating patterns to achieve a target temperature profile. As an example and not by way of limitation, as illustrated in FIG. 6, the load disposed inside the cavity may have the starting temperature profile 602, in which the left half has initial temperature profile $T_1$, and the right half has an initial temperature profile $T_2$, wherein temperature profile $T_2 > T_1$. In particular embodiments, once the set of achievable heating patterns has been predicted or measured, an electromagnetic device (e.g., cooking appliance 102) may then utilize one or more processors 104 to calculate the optimal sequence of control parameters that will yield heating patterns whose sum may achieve a target temperature profile. As an example and not by way of limitation, as illustrated in FIG. 6, the target temperature profile for the load disposed inside the cavity may be a desired final temperature profile 604, in which a first third has a final temperature profile $T_3$, a second third has a final temperature profile $T_4$, and a final third has a final temperature profile $T_5$, wherein temperature profile $T_5 > T_4 > T_3$. In particular embodiments, in order to achieve a desired final temperature profile 604 from the starting temperature profile 602, the cooking appliance 102 may generally impose a sequential series of distinct heating patterns 606, each arising from a different combination of control parameters. The net effect is the desired temperature rise, as illustrated by the optimum sequence and final temperature profile 608, which reproduces the desired final temperature profile 604 as closely as possible. This is encapsulated in the following equation. Choose optimal $t_i$ such that:

$$\Sigma_i t_i \Delta T(p_i) = (T_{desired} - T_{actual}) \qquad \text{(Equation 9)}$$

In Equation 9, $(T_{desired} - T_{actual})$ is the desired temperature rise map (essentially, a two-dimensional image), $\Delta T(p_i)$ are the temperature increase maps for given parameter combinations $p_i$, and $t_i$ are the times spent heating for each of those combinations. In particular embodiments, no single choice of control parameters may produce the desired temperature profile result, and thus the present embodiments include calculating the correct combination of heating patterns to direct to the load disposed inside the cavity of an electromagnetic device (e.g., cooking appliance 102) such that the cumulative temperature rise results in the desired temperature profile or the best approximation thereof. Since an electromagnetic device may only add heat and not take heat away, the heating times $t_i$ for the patterns used in the series may all be non-negative. Thus, if the individual heating patterns $\Delta T(p_i)$ are known for all possible permutations of control parameters, the non-negative parameters $t_i$ may be solved for by an optimization algorithm, such as non-negative least squares (NNLS). In particular embodiments, constant or temperature-dependent cooling rates of the load may be measured or estimated, and the heating patterns can be corrected for cooling effects to yield better accuracy in the prediction of temperature rise.

In particular embodiments, a two-step process may be implemented for providing two-dimensional heat deposition maps. An optional compression of the heating pattern data via an image decomposition algorithm such as nonnegative matrix factorization may be utilized. This may serve to represent the set of potential heating patterns in a compact subspace and speed up computation. Subsequent calculation of a weighted series of heating patterns via a process such as nonnegative least squares may be utilized to achieve the target temperature map. In particular embodiments, non-negative matrix factorization (NNMF) may include an algorithm to deconstruct a set of images as a nonnegative combination of nonnegative basis images, and may be represented mathematically as:

$$\mathbb{X} = \mathbb{W}_x \mathbb{H} \qquad \text{(Equation 10)}$$

In Equation 10, $\mathbb{X}$ is the reconstructed approximation of the original image set, $\mathbb{W}$ is a weighting matrix, and $\mathbb{H}$ is the set of basis images. Thus, Equation 10 may be utilized to generate heating maps for plausible food geometries and dielectric properties, in which NNMF may represent the full diversity of possible heating patterns within a very low-dimensional basis subspace.

Figure 7:
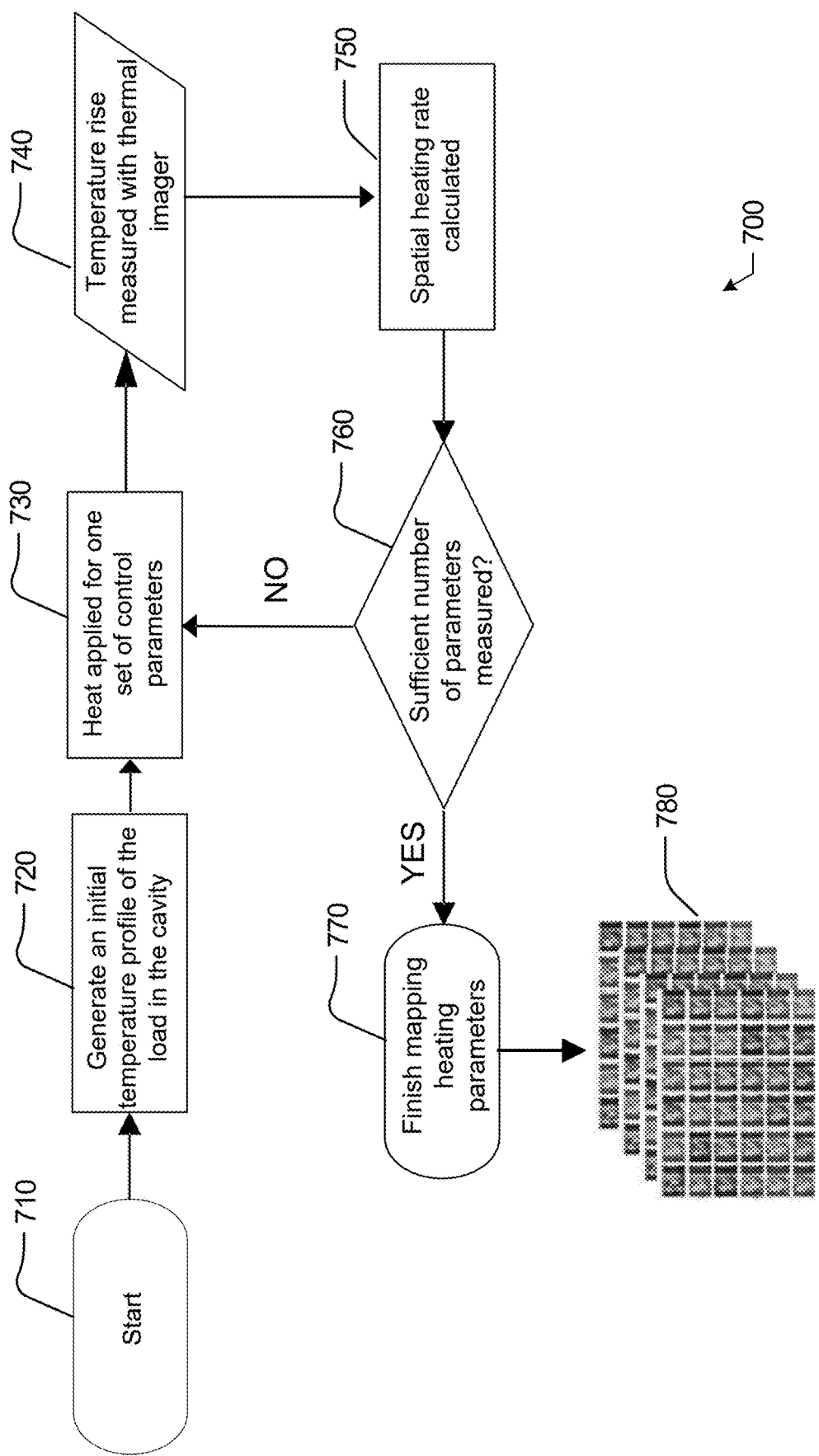
FIG. 7 illustrates an example workflow diagram depicting a technique for mapping heat deposition in a cooking appliance using Fast Pattern Temperature Imaging.

FIG. 7 illustrates an example workflow diagram 700 depicting a technique for mapping heat deposition in a cooking appliance 102 using Fast Pattern Temperature Imaging. In particular embodiments, the workflow diagram may begin at block 710, where an electromagnetic device (e.g., cooking appliance 102) may generate an initial map of the temperature profile of a load disposed inside a cavity of the electromagnetic device at block 720. It is understood that temperature profile, heat map, and temperature map may be used interchangeably within this disclosure. In this example, the electromagnetic device may perform the step as in block 720 by using a thermal imager to measure the spatial temperature profile of the load.

At block 730, the electromagnetic device (e.g., cooking appliance 102) may emit electromagnetic radiation into the cavity based on one or more sets of control parameters. In particular embodiments, a change in temperature of the load during the emission of electromagnetic radiation (e.g., heat) may be measured by one or more sensors 108. In this example, at block 740, the electromagnetic device may measure the temperature rise of the load with a thermal imager. At block 750, the electromagnetic device may then calculate the spatial heating rate of the load based on the measured temperature rise of the load described in block 740, as according to Equation 8. In particular embodiments, one or more updated maps of the temperature profile of the load may be generated based on the change of temperature of the load, wherein the updated maps comprise an indication of the spatial heating rate within the load.

At block 760, the electromagnetic device (e.g., cooking appliance 102) may evaluate whether a sufficient number of parameters have been measured. In this example, the electromagnetic device may determine a sufficient number of parameters have been measured by determining that a sufficient number of maps of the temperature profile in the load 808 have been measured. In particular embodiments, the electromagnetic device may determine that a sufficient number of parameters have not been measured, in which case the electromagnetic device may reperform the steps in blocks 730, 740, 750, and 760 until a sufficient number of parameters have been measured. At block 770, in response to determining that a sufficient number of parameters have been measured, the electromagnetic device may finish mapping heating parameters as in block 770, and store the one or more maps of electromagnetic energy absorbed by the load as data set 780.

Figure 8:
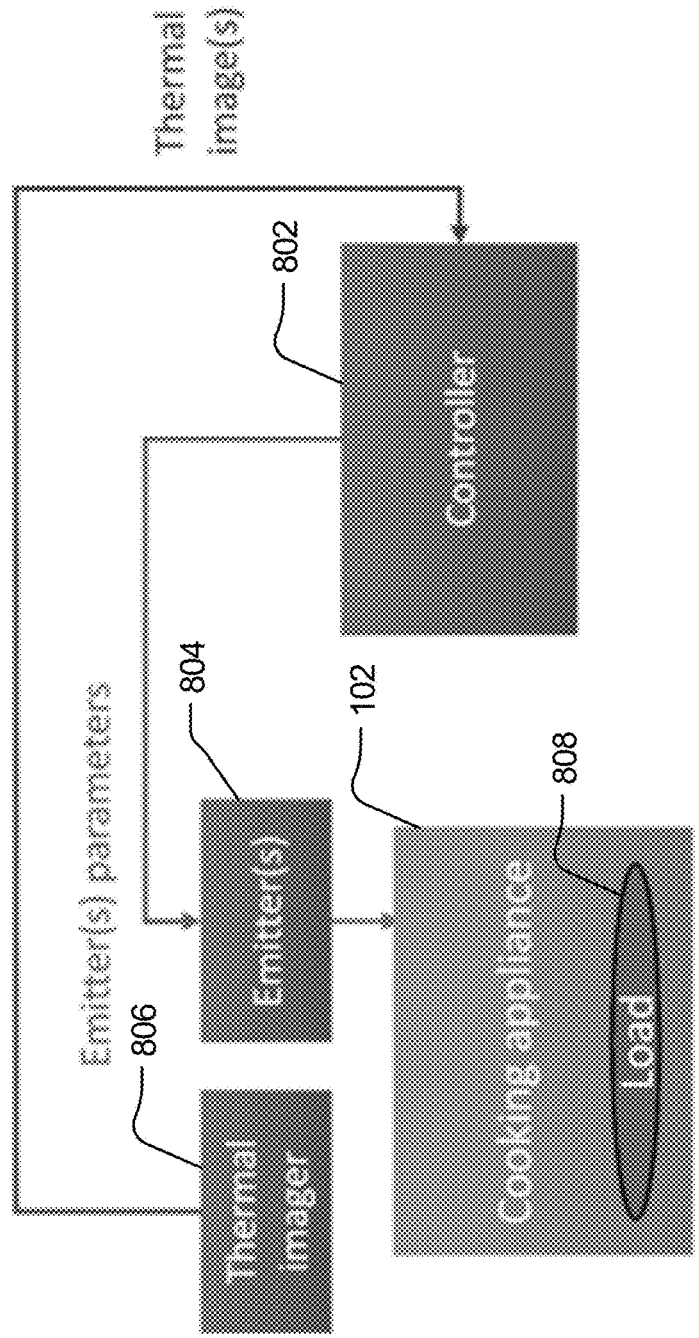
FIG. 8 illustrates an example system diagram for providing a temperature profile based cooking appliance using Fast Pattern Temperature Imaging.

FIG. 8 illustrates an example system diagram 800 for providing a temperature profile based cooking appliance 102 using Fast Pattern Temperature Imaging. As illustrated, load 808 is placed inside the cooking appliance 102. In particular embodiments, the load 808 may include one or more objects. In particular embodiments, cooking appliance 102 may be operated deterministically by controller 802, and one or more emitters 804 may be instructed by the controller 802 to direct electromagnetic radiation into the cavity of cooking appliance 102. As an example and not by way of limitation, one or more emitters 804 may be instructed by controller 802 to emit electromagnetic radiation into the cavity based on one or more control parameters to achieve a target spatial heating rate within the load 808 until a target temperature profile is achieved.

In particular embodiments, a thermal imaging device 806 (e.g., an infrared (IR) camera) may image and measure the temperature profile of the load 808 with FPTI and/or AFPTI by directing a plurality of short-duration heating pulses at load 808 and performing prompt spatial thermometry to detect temperature increments in the load 808 during heating. Based on these heating pattern measurements, controller 802 may calculate one or more sequences of updated control parameters to steer the heating pattern of load 808 within the electromagnetic device (e.g., cooking appliance 102). In particular embodiments, the electromagnetic device may generate updated control parameter configurations based on the spatial heating rate within the load 808 as indicated by one or more updated heat maps. Further, the electromagnetic device may generate updated control parameter configurations based on a combination of the one or more updated heat maps and the target spatial heating rate within the load 808. In this example, the updated control parameters may specify a sequence of parameter combinations of emitting electromagnetic radiation into the cavity, and may be configured to heat the load 808 via absorption of the electromagnetic radiation emitted by one or more emitters 804 in accordance with a target temperature profile with respect to the load 808.

In some cases, when the duration of each FPTI measurement is fixed, system parameter combinations resulting in higher heating rates may cause unnecessary overheating of the load 808, while for low heating rates, the signal-to-noise ratio of the heat map may suffer. This problem may also arise due to varying heating rates in different types of loads 808, where the heating rate may not be estimated prior to performing the FPTI process. In particular embodiments, an extension of FPTI, Adaptive Fast Pattern Temperature Imaging (AFPTI) may be adopted. As an example and not by way of limitation, AFPTI may allow for minimizing the measuring time by adaptively controlling the heating pulse duration based on an observed temperature increment in the load 808. In this example, AFPTI may guarantee a constant peak signal-to-noise ratio (PSNR) for all types of loads 808 and for all combinations of system control parameters, regardless of the absolute value of heat deposition. The peak signal-to-noise ratio may be demonstrated by the following:

$$PSNR = \frac{\text{Max}_{Load}}{Std_{Background}} \quad \text{(Equation 11)}$$

Equation 11 expresses the peak signal-to-noise ratio as a function of the maximum heating rate in the load 808 ($\text{Max}_{Load}$) and the standard deviation in the background ($Std_{Background}$) of the spatial deposition heating map. As an example, in applications in which there are many possible combinations of system control parameters, AFPTI may reduce the total amount of measuring time, avoid overheating of the load 808, and guarantee a constant PSNR independent of the type of load 808 and/or the applied combination of system parameters.

Figure 9:
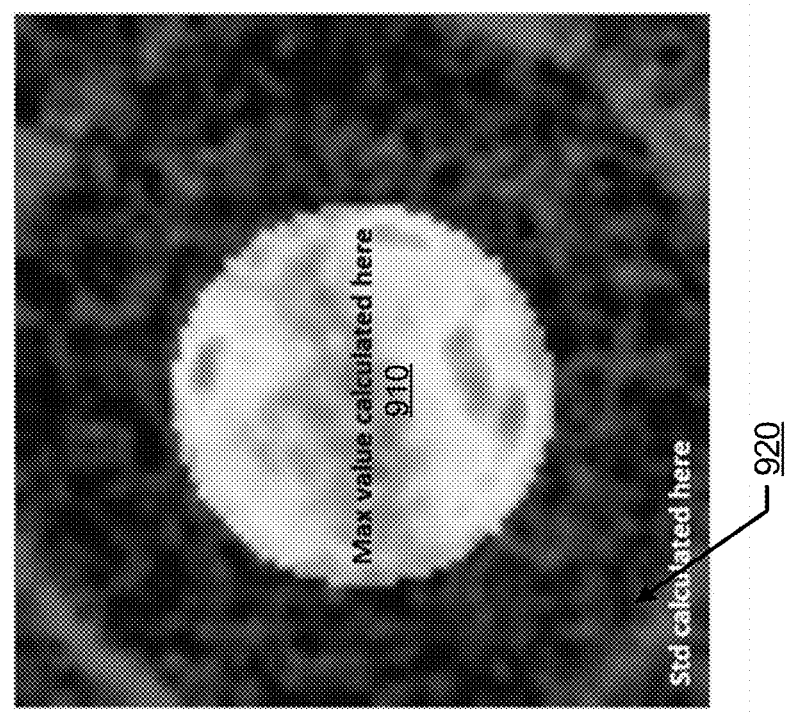
FIG. 9 illustrates an example diagram depicting a thermal image.

FIG. 9 demonstrates an example diagram depicting a thermal image 900. In particular embodiments, thermal image 900 may demonstrate an example dielectric heat spatial deposition map with a peak signal-to-noise ratio as a function of the maximum heating rate in the load 808 and the standard deviation in the background of the load 808. Section 910 may represent where the maximum heating rate in the load 808 is calculated, as per Equation 11, above. Section 920 may represent one location in which the standard deviation may be calculated for the background of the thermal image, as per Equation 11, above. As used herein, "background" of the thermal image may refer to the portion of the thermal image excluding the load 808 and which nominally does not exhibit a temperature rise due to RF heating. In particular embodiments, measurement of the spatially dependent temperature rise of the load 808 may allow for an accurate prediction of the future temperature profile of the load 808, which may be a key step in performing closed-loop control to achieve a homogenous profile and/or targeted temperature pattern. The prediction of the load's 808 future temperature profile may take into account the physics of thermal diffusion, convection, and radiation, as those factors may affect both heating and cooling of the load 808. In particular embodiments, the heat deposition maps obtained using FPTI and/or AFPTI may be corrected by adding a cooling term in accordance with Newton's Law of Cooling, which states that the cooling rate is proportional to the difference between an object's temperature and the ambient temperature, as represented by the following equation:

$$C_{ij} = -k(T_{ij} - T_{amb}) \quad \text{(Equation 12)}$$

In Equation 12, $C_{ij}$ is the calculated cooling rate in K/s for the ijth pixel in the image of the heat map, and k represents the positive cooling constant. A factor of −1 is included to indicate that the cooling rate as measured in K/s will be a negative value if the load 808 temperature is above the ambient temperature. As an example and not by way of limitation, k may be estimated as the same value for all regions in the load 808. The cooling rate, however, is position-dependent due to the general temperature of the load 808 being non-uniform. The linear approximation of cooling may be generally valid for temperatures near ambient temperature (such as the 0-100° C. range in which food is typically served), but additional nonlinear terms may be included to improve accuracy. In particular embodiments, a cooling map may be added directly to the FPTI and/or AFPTI heat map to yield a corrected estimate of heating, as represented below:

$$K(p_z) \rightarrow \frac{T_2 - T_1}{t_2 - t_1} - C = \frac{T_2 - T_1}{t_2 - t_1} + k(T_1 - T_{amb} * \mathbb{I}) \quad \text{(Equation 13)}$$

In Equation 13, $\mathbb{I}$ is the i×j identity matrix. In particular embodiments, ambient temperature may be measured from the background of the cavity using the same thermal sensor 108 used to perform FPTI and/or AFPTI, or by using an external temperature sensor 108 placed in the boundaries of the electromagnetic device (e.g., cooking appliance 102). The cooling constant k may be predicted if the nature of the load 808 is known, or it may be measured empirically by multiple measurements of the heating pattern arising from the same set of control parameter combinations at different load 808 temperatures. These corrections may take into account the effects of incremental cooling between successive thermal images and nonlinear temperature rise and/or fall due to temperature-dependent heat dissipation, which are key effects for temperature prediction and control. In particular embodiments, ambient temperature may be measured within the cavity and a spatially dependent cooling rate within the load disposed inside the cavity may be determined based on the ambient temperature within the cavity. As an example and not by way of limitation, the one or more updated maps of electromagnetic energy absorbed by the load may be corrected based on the spatially dependent cooling rate within the cavity. As another example and not by way of limitation, the one or more updated maps of electromagnetic energy absorbed by the load and corrected based on the spatially dependent cooling rate within the cavity may further comprise an indication of the ambient heating rate and/or ambient cooling rate within the cavity of the load. According to experimental measurements, the constant k may be similar for a wide variety of loads 808, allowing for estimations without a direct measurement in the electromagnetic device. In particular embodiments, the cooling estimate may be reflected as a spatial map calculated from the temperature profile of the load 808 and the ambient temperature, and may be added to all of the FPTI and/or AFPTI-generated heat maps to improve the accuracy of the temperature rise prediction.

Figure 10:
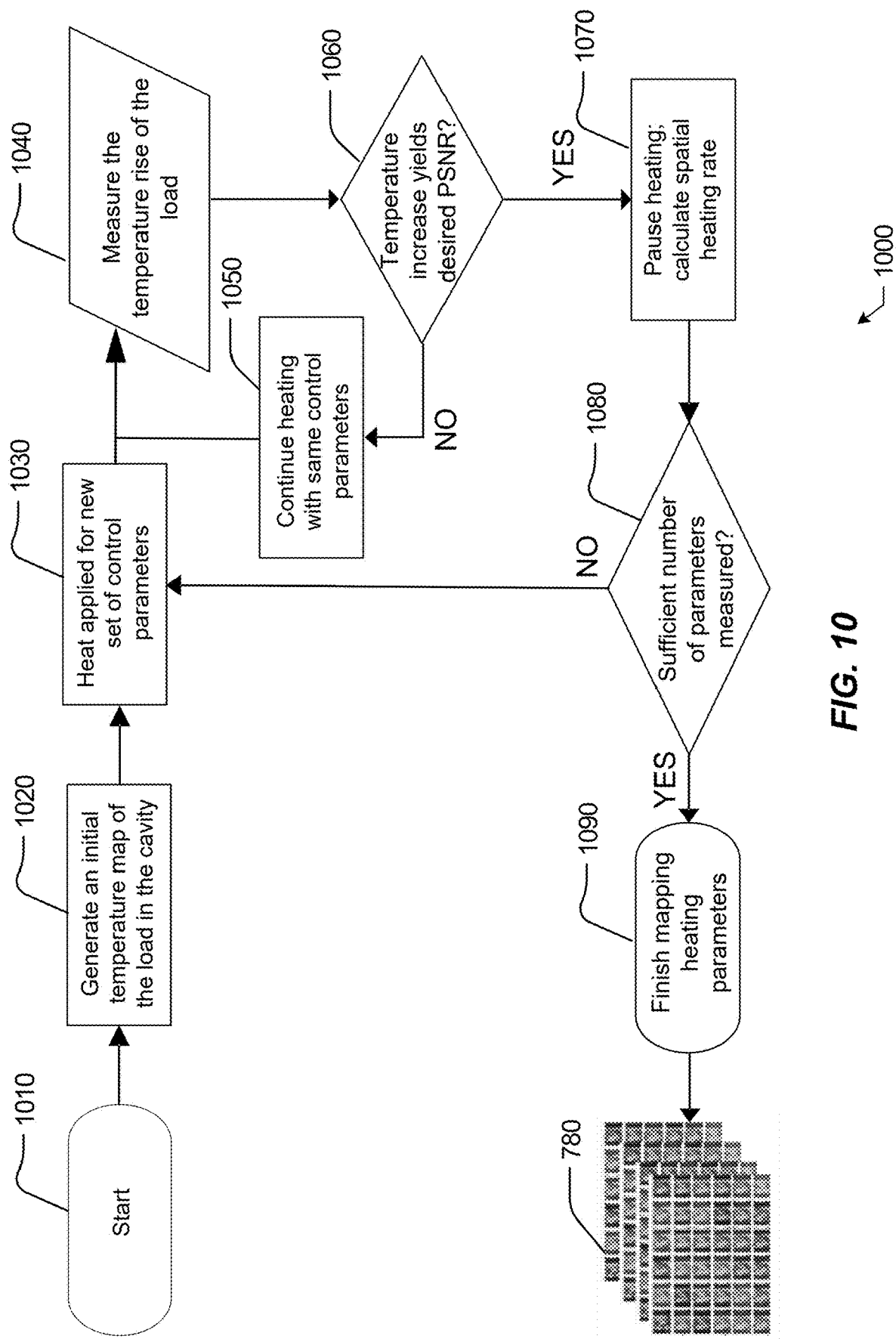
FIG. 10 illustrates an example workflow diagram depicting a technique for mapping heat deposition in a cooking appliance using Adaptive Fast Pattern Temperature Imaging.

FIG. 10 illustrates an example workflow diagram 1000 depicting a technique for mapping heat deposition in a cooking appliance 102 using Adaptive Fast Pattern Temperature Imaging. Similar to FIG. 7, the workflow diagram may begin at block 1010, where an electromagnetic device (e.g., cooking appliance 102) may generate an initial map of the load temperature at block 1020.

At block 1030, the electromagnetic device (e.g., cooking appliance 102) may emit electromagnetic radiation into the cavity based on one or more new (or updated), sets of control parameters. In particular embodiments, controller 802 of cooking appliance 102 may send instructions to the one or more emitters 804 to emit electromagnetic radiation into the cavity based on one set of control parameters.

At block 1040, the electromagnetic device (e.g., cooking appliance 102) may measure the temperature rise of the load 808 (e.g., spatial heating rate within the load 808) by one or more sensors 108 to determine that the temperature rise of the load 808 yields a target peak signal-to-noise ratio at block 1060. In response to determining that the temperature rise in the load 808 resulting from RF heating with the one or more control parameters of block 1030 yield the target PSNR, controller 802 may send instructions to one or more emitters 804 of the electromagnetic device to suspend emission of electromagnetic radiation and calculate the spatial heating rate within the load 808. In an alternate example, the electromagnetic device may determine the temperature increase in block 1040 does not yield a desired PSNR, in which case controller 802 may send instructions to the electromagnetic device to continue heating with the same control parameters, as in block 1050, and further reperform the steps of 1040 and 1060.

In particular embodiments, in response to block 1070, controller 802 may send instructions to the electromagnetic device (e.g., cooking appliance 102) to evaluate whether a sufficient number of parameters have been measured, as in block 1080. As an example and not by way of limitation, the electromagnetic device may determine a sufficient number of parameters have been measured by determining that the electromagnetic radiation emitted into the cavity based on the set of control parameters in block 1030 yields a target spatial heating rate within the load 808. As another example and not by way of limitation, the electromagnetic device may determine a sufficient number of parameters have been measured by using the method of non-negative least squares (NNLS) to calculate an optimal heating sequence for load 808. In this example, if the calculated final temperature of the load 808 at the end of the heating sequence is acceptably close to the target temperature profile, the electromagnetic device may determine that a sufficient number of parameters have been measured. In an alternate example, the electromagnetic device may determine that a sufficient number of parameters have not been measured, in which case the electromagnetic device may reperform the steps in blocks 1030, 1040, 1050, 1060, and 1070 until a sufficient number of parameters have been measured. At block 1090, in response to determining that a sufficient number of parameters have been measured, the electromagnetic device may finish mapping heating parameters and store the one or more maps of electromagnetic energy absorbed by the load as data set 780.

Figure 11:
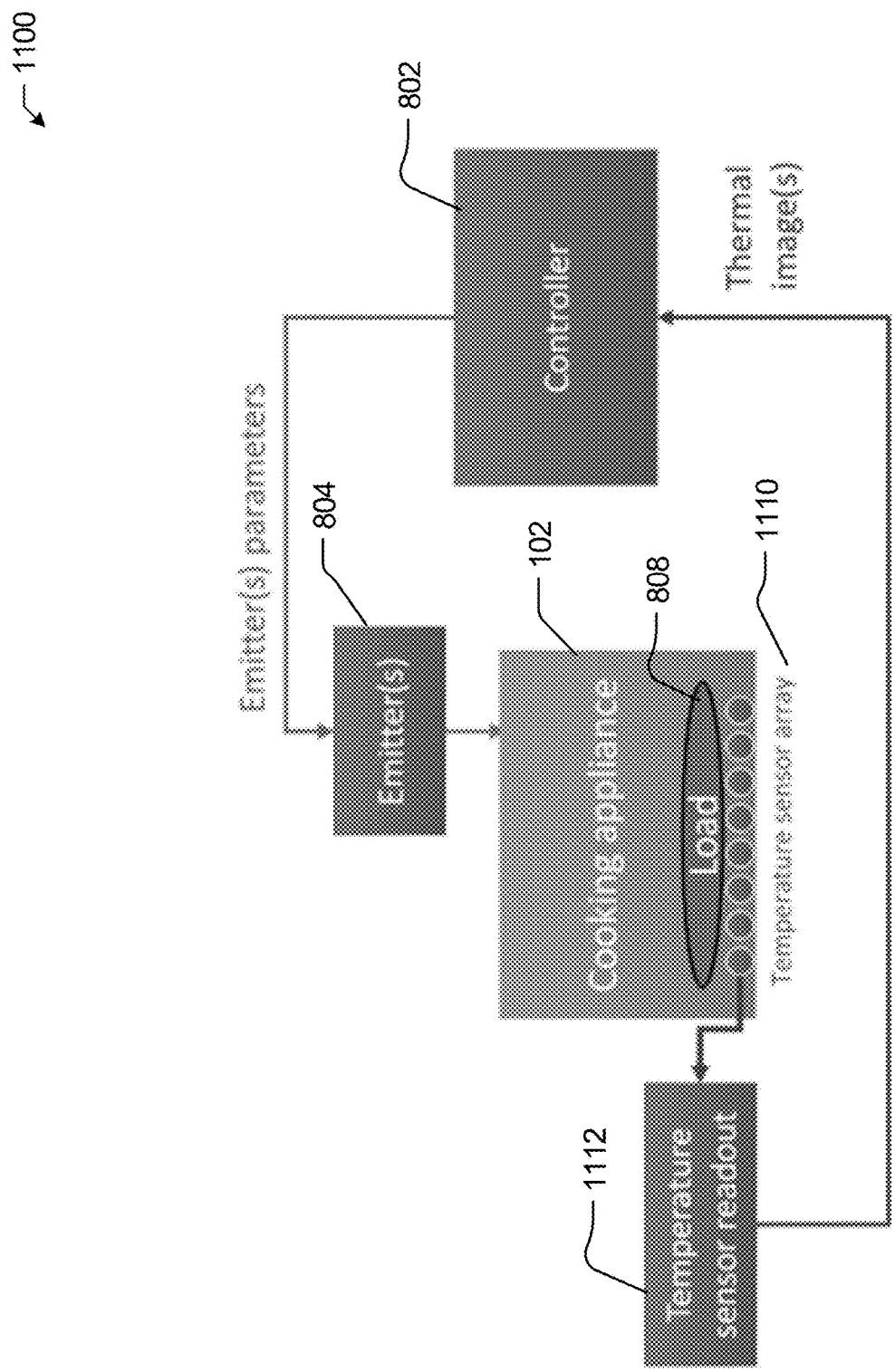
FIG. 11 illustrates an example diagram for providing a temperature profile based cooking appliance using Fast Pattern Temperature Imaging and/or Adaptive Fast Pattern Temperature Imaging.

FIG. 11 illustrates an example diagram 1100 for providing a temperature profile based cooking appliance 102 using Fast Pattern Temperature Imaging and/or Adaptive Fast Pattern Temperature Imaging. In particular embodiments, diagram 1100 may be a technique for performing the workflow diagram in FIG. 10. As illustrated, load 808 is placed inside the cooking appliance 102. As an example and not by way of limitation, the load 808 may include one or more objects. In particular embodiments, cooking appliance 102 may be operated deterministically by the controller 802, and one or more emitters 804 may be instructed by the controller 802 to direct electromagnetic radiation into the cavity of cooking appliance 102. For example, one or more emitters 804 may be instructed by controller 802 to emit electromagnetic radiation into the cavity based on one or more control parameters to achieve a target spatial heating rate within the load 808 until a target temperature profile is achieved. In particular embodiments, a temperature sensor array 1110 may be located at the bottom of the cavity of cooking appliance 102. As an example and not by way of limitation, the temperature sensor array 1110 may produce a temperature sensor readout 1112, which may generate thermal images to be input to controller 802. Although the embodiment of FIG. 11 demonstrates the temperature sensor array 1110 as a series of temperature sensors adjacent to the load, this disclosure contemplates any suitable sensor configuration.

Figure 12:
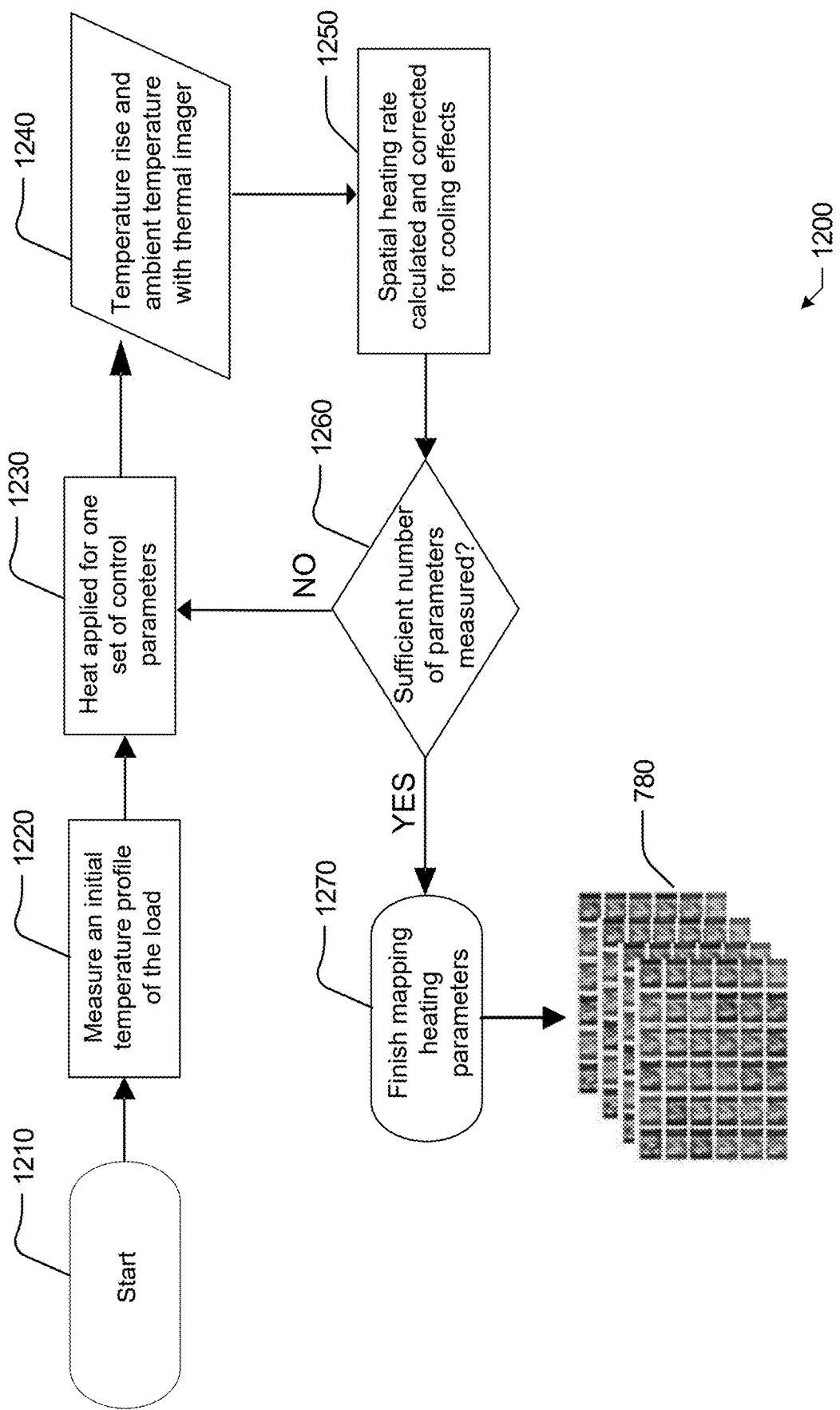
FIG. 12 illustrates an example workflow diagram depicting a technique for mapping heat deposition in a cooking appliance using Fast Pattern Temperature Imaging with cooling correction.

FIG. 12 illustrates an example workflow diagram 1200 depicting a technique for mapping heat deposition in cooking appliance 102 using Fast Pattern Temperature Imaging with cooling correction. In particular embodiments, the workflow diagram may begin at block 1210, where an where an electromagnetic device (e.g., cooking appliance 102) may measure an initial temperature profile of a load 808 disposed inside a cavity of the electromagnetic device at block 1220.

At block 1230, the electromagnetic device (e.g., cooking appliance 102) may emit electromagnetic radiation into the cavity based on one or more sets of control parameters. The control parameters may include but are not limited to one or a combination of radiation frequency, radiation amplitude, radiation phase, radiation phase shift, load rotation, load translation, or mode stirrer configuration. In particular embodiments, a change in temperature of the load 808 during the emission of electromagnetic radiation and the ambient temperature within the cavity may be measured by one or more sensors 108, as in block 1240. In particular embodiments, the ambient temperature may be measured using the same thermal sensor 108 used to perform FPTI and/or AFPTI, or alternatively, by an external t temperature sensor 108 in the boundaries of the cooking appliance 102. As an example and not by way of limitation, the ambient temperature may be measured by one or more thermal imagers 806 if the field of view of the one or more thermal imagers 806 extends beyond the load 808 and includes some of the surrounding environment within the cavity. This may be particularly relevant for RF heating, where the walls of the cavity within cooking appliance 102 may remain approximately at room temperature. Knowledge of the ambient temperature in addition to the load temperature allows for cooling corrections to be made to the measured heating maps In particular embodiments, in response to determining an ambient temperature within the cavity, the electromagnetic device (e.g., cooking appliance 102) may generate one or more updated maps, further comprising an indication of the ambient temperature within the cavity of the load 808. In particular embodiments, in response to determining the temperature rise of the load 808 and the ambient temperature within the cavity, the electromagnetic device may calculate a spatial heating rate of the load 808 and correct the spatial heating rate for cooling effects, in block 1250. In particular embodiments, based on the ambient temperature measured in block 1240, the spatially dependent cooling rate may be calculated for the load 808 disposed inside the cavity, and one or more updated maps may be generated to comprise an indication of the cooling rate within the cavity of the load 808. In particular embodiments, the rate of the temperature rise in block 1240 may be calculated by the initial temperature $T_1$ measured at time $t_1$ and the subsequent temperature $T_2$ measured at time $t_2$ after heating. The effects of cooling may be incorporated through concurrent measurements of the ambient temperature as demonstrated by the following:

$$\text{Heat deposition}(T_2, T_{Ambient})\left[\frac{\text{Kelvin}}{\text{second}}\right] = \quad \text{(Equation 14)}$$
$$\frac{T_2 - T_1}{t_2 - t_1} + k(T_2 - T_{Ambient})$$

At block 1260, the electromagnetic device (e.g., cooking appliance 102) may determine if a sufficient number of control parameters have been measured. As an example and not by way of limitation, the electromagnetic device may determine that a sufficient number of parameters have been measured. As an example and not by way of limitation, the electromagnetic device may determine that a sufficient number of parameters have been measured by determining that the electromagnetic radiation emitted into the cavity based on the set of control parameters in block 1230 yields a target spatial heating rate within the load 808. As another example and not by way of limitation, the electromagnetic device may determine a sufficient number of parameters have been measured by using the method of non-negative least squares (NNLS) to calculate an optimal heating sequence for load 808. In this example, if the calculated final temperature of the load 808 at the end of the heating sequence is acceptably close to the target temperature profile, the electromagnetic device may determine that a sufficient number of parameters have been measured. In particular embodiments, at block 1260, the electromagnetic device may determine that a sufficient number of control parameters have not been measured, in which case the controller 802 of the electromagnetic device may generate instructions to reperform the steps in blocks 1230, 1240, 1250, and 1260. In an alternate example, in response to determining a sufficient number of control parameters have been measured, the electromagnetic device may finish mapping heating parameters at block 1270, suspend the emission of electromagnetic radiation into the cavity, and store the one or more maps of electromagnetic energy absorbed by the load 808 as data set 780.

Figure 13:
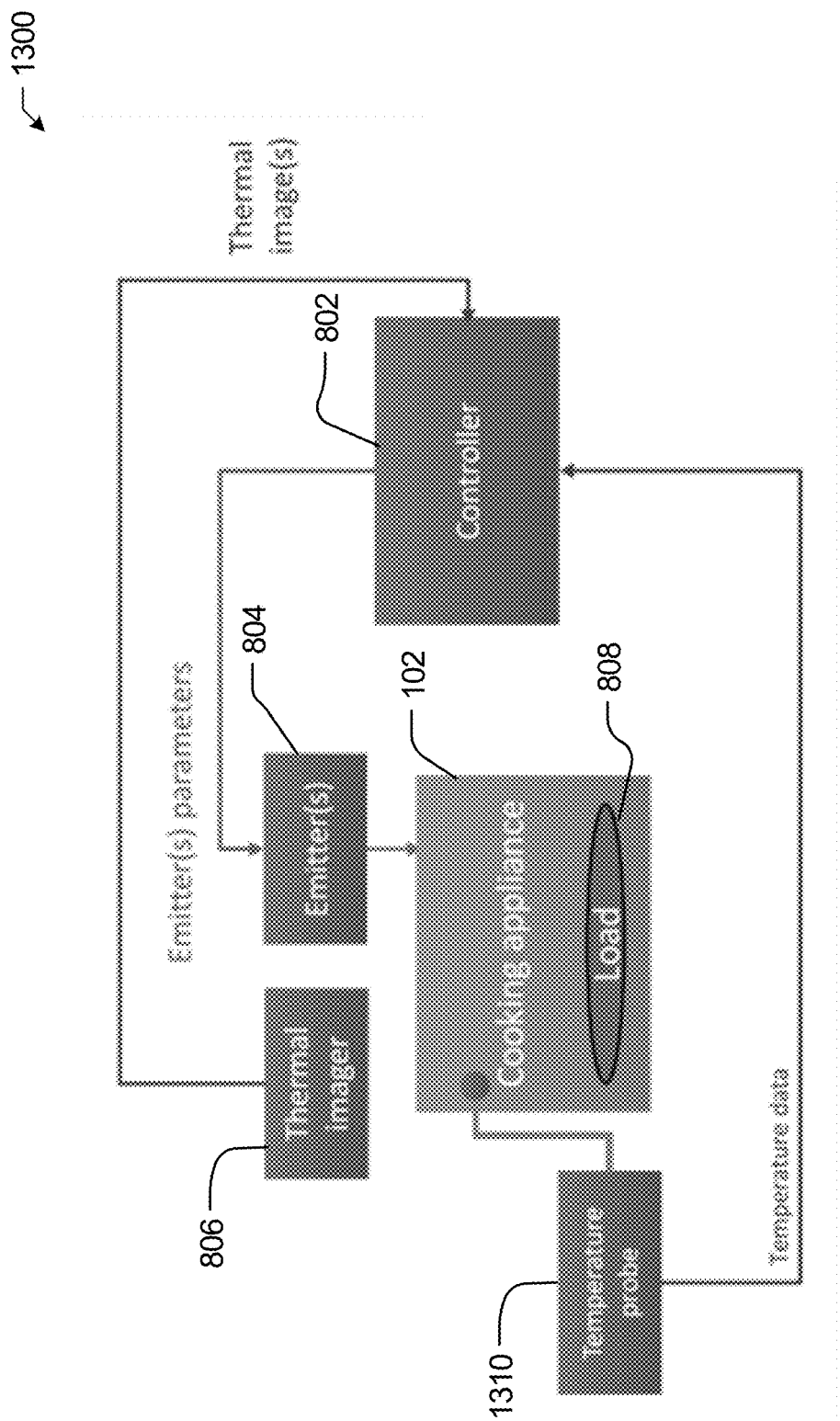
FIG. 13 illustrates an example system diagram for providing a temperature profile based cooking appliance using Fast Pattern Temperature Imaging with cooling correction.

FIG. 13 illustrates an example system diagram 1300 for providing a temperature profile based cooking appliance 102 using Fast Pattern Temperature Imaging with cooling correction. In particular embodiments, the example system diagram 1300 may provide a technique for performing the workflow diagram in FIG. 12. As illustrated, load 808 may be placed inside cooking appliance 102. Cooking appliance 102 may be operated deterministically by controller 802, and one or more emitters 804 may be instructed by the controller 802 to direct/emit radiation into the cavity of cooking appliance 102, where temperature probe 1310 may be located. In particular embodiments, thermal imager 806 may generate thermal images as input to controller 802. In particular embodiments, temperature probe 1310 may collect temperature data as input to controller 802. As an example and not by way of limitation, temperature probe 1310 may be a temperature sensor 108 placed within or near cooking appliance 102 to measure ambient temperature. Knowledge of the ambient temperature in addition to the load temperature allows for cooling corrections to be made to the measured heating maps. Although this disclosure discusses temperature probe 1310 as a temperature sensor 108, this disclosure contemplates any suitable temperature probe 1310 configuration.

Figure 14A:
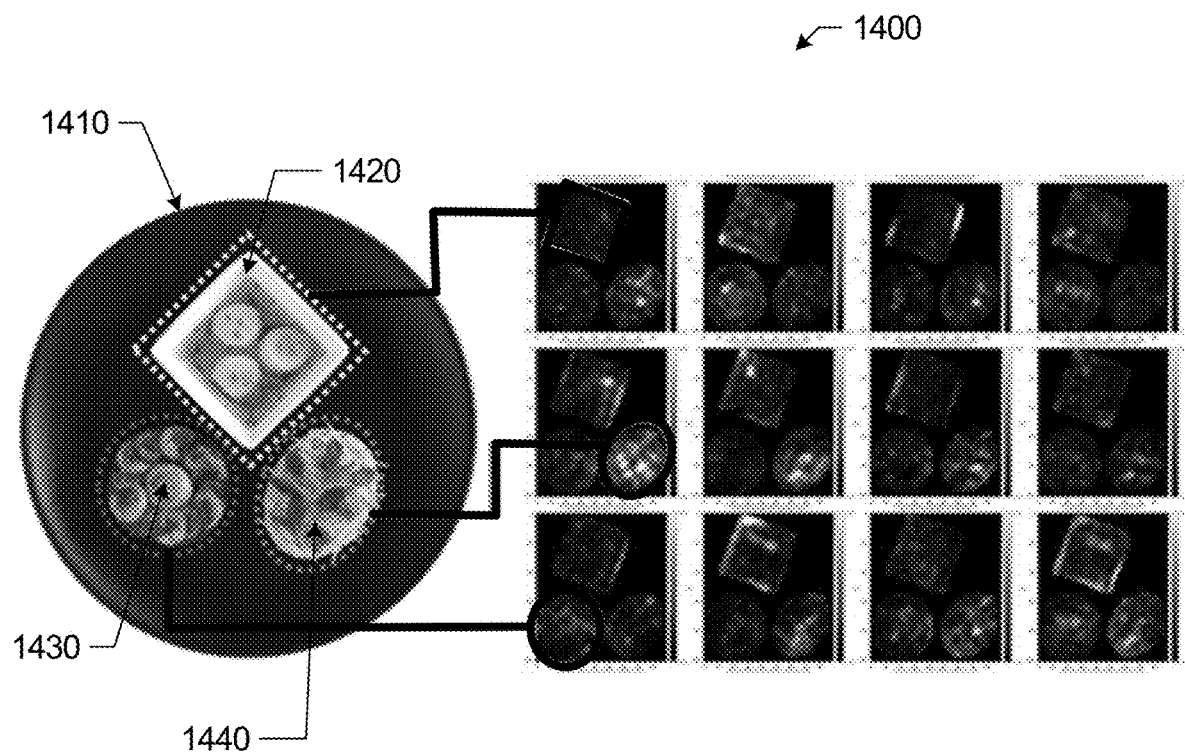
FIGS. 14A and 14B illustrate example diagrams depicting heating maps utilizing a temperature profile-based cooking appliance with multiple loads.
Figure 14B:
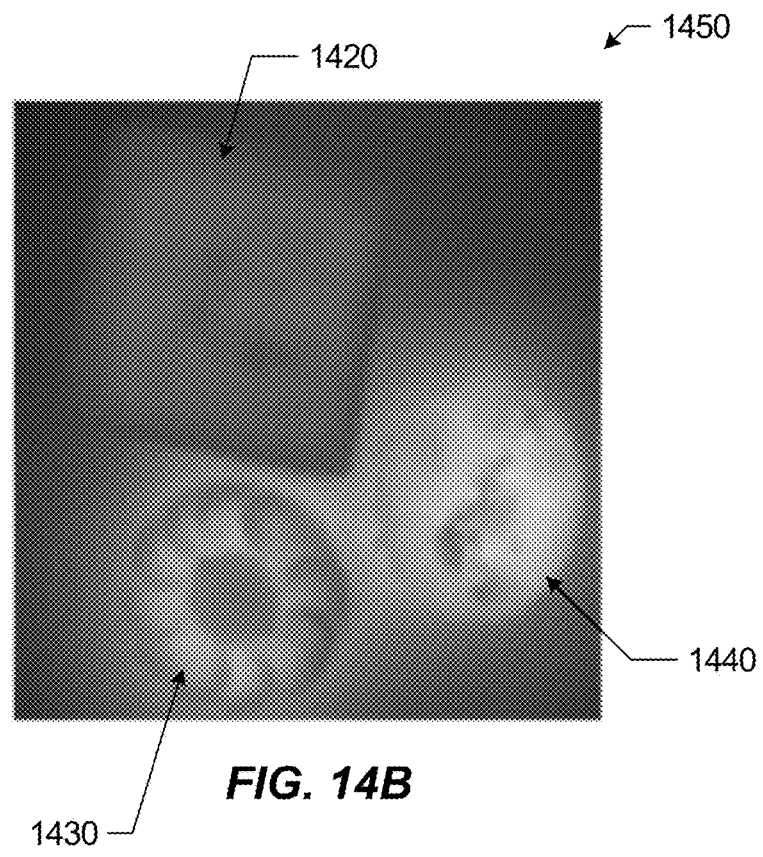

FIGS. 14A-14B illustrate example diagrams, 1400 and 1450, depicting heating maps utilizing a temperature profile-based cooking appliance 102 with multiple loads. For example, plate 1410 demonstrates three different foods, food 1420, food 1430, and food 1440. As such, when heating pulses are directed at each food through FPTI and/or AFPTI, the measured spatial deposition associated with each food may be reflected in the associated heat maps. In this example, each food may have a particular optimal final temperature profile and must be heated individually to a specific target temperature by the selection of an optimal sequence of control parameters throughout the heating process. Example diagram 1450 demonstrates the final temperature profile of plate 1410 showing mean temperatures for each food 1420, 1430, and 1440. In particular embodiments, each portion of the food plate 1410 may be deterministically heated to a customized target temperature profile.

Figure 15:
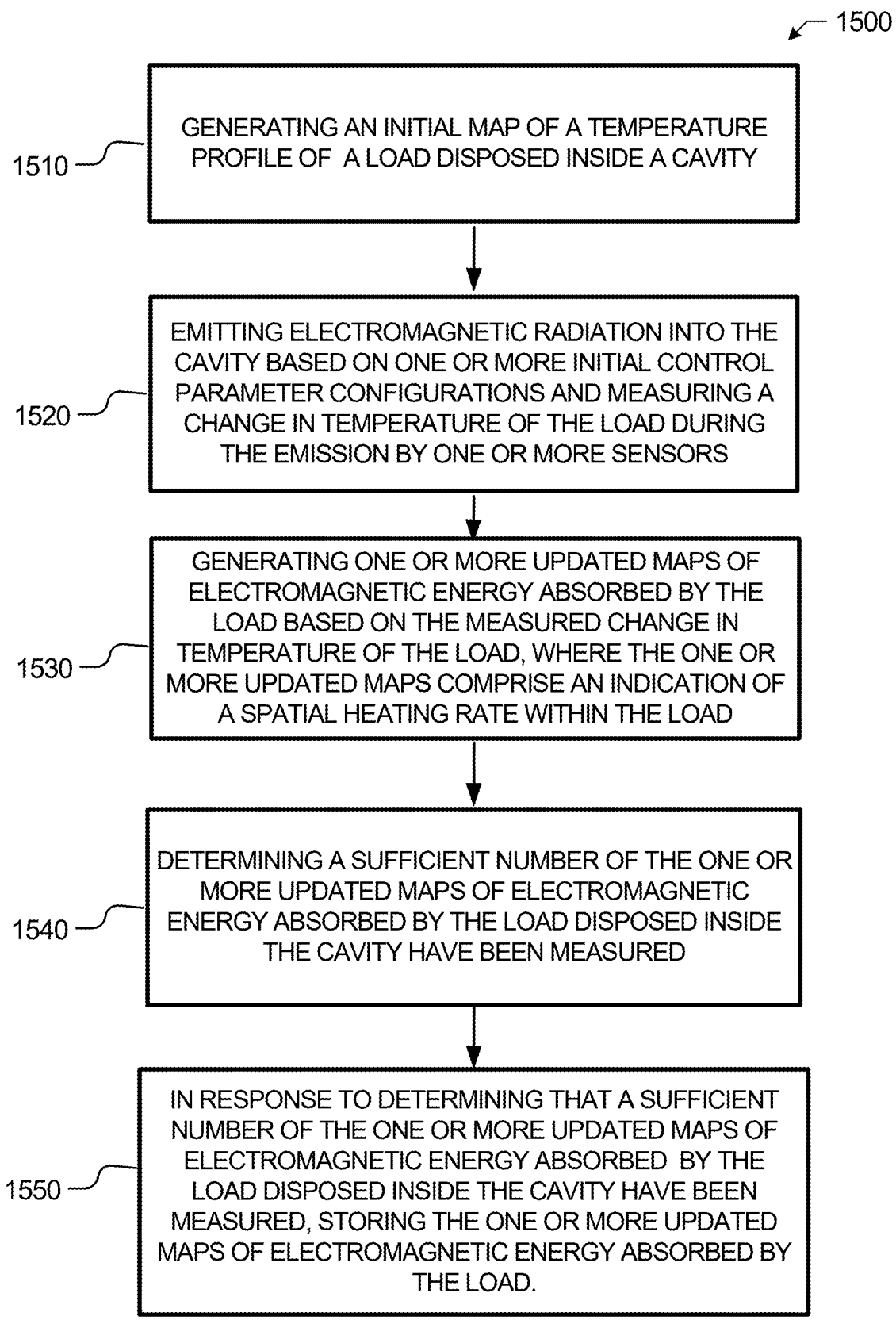
FIG. 15 illustrates a flow diagram of a method for mapping heat deposition in a cooking appliance.

FIG. 15 illustrates a flow diagram of method 1500 for mapping heat deposition in cooking appliance 102. The method 1500 may be performed utilizing one or more electromagnetic devices (e.g., cooking appliance 102) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing image data), software (e.g., instructions running/executing on one or more processors), firmware (e.g., microcode), or some combination thereof.

The method 1500 may begin at step 1510 with the electromagnetic device (e.g., cooking appliance 102) generating an initial map of a temperature profile of a load 808 disposed inside a cavity of cooking appliance 102. The method 1500 may continue at block 1520 with the electromagnetic device (e.g., cooking appliance 102) emitting electromagnetic radiation into the cavity based on one or more initial control parameter configurations, and the change in temperature of the load during the emission may be measured by one or more sensors 108. In this example, the electromagnetic device may measure the temperature rise of the load with a thermal imager.

The method 1500 may then continue at block 1530 with the electromagnetic device (e.g., cooking appliance 102) generating one or more updated maps of the electromagnetic energy absorbed by the load 808 based on the measured change in temperature of the load 808 in step 1520. As an example and not by way of limitation, the one or more updated maps of electromagnetic energy absorbed by the load may comprise an indication of a spatial heating rate within the load. The method 1500 may then continue at block 1540 with the electromagnetic device determining whether a sufficient number of the one or more updated maps of electromagnetic energy of the load 808 disposed inside the cavity have been measured.

The method 1500 may then conclude at block 1550 with the electromagnetic device (e.g., cooking appliance 102), in response to determining that a sufficient number of the one or more updated maps of the electromagnetic energy absorbed by the load 808 disposed inside the cavity have been measured, suspending the emission of electromagnetic radiation into the cavity, and storing the one or more updated maps of the electromagnetic energy absorbed by the load 808 as data set 780. Particular embodiments may repeat one or more steps of the method of FIG. 15, where appropriate. Although this disclosure describes and illustrates particular steps of the method of FIG. 15 as occurring in a particular order, this disclosure contemplates any suitable steps of the method of FIG. 15 occurring in any suitable order. Moreover, although this disclosure describes and illustrates an example method for mapping heat deposition in a cooking appliance through fast pattern temperature imaging, including the particular steps of the method of FIG. 15, this disclosure contemplates any suitable method for mapping heat deposition, including any suitable steps, which may include all, some, or none of the steps of the method of FIG. 15, where appropriate. Furthermore, although this disclosure describes and illustrates particular components, devices, or systems carrying out particular steps of the method of FIG. 15, this disclosure contemplates any suitable combination of any suitable components, devices, or systems carrying out any suitable steps of the method of FIG. 15.

Systems and Methods

Figure 16:
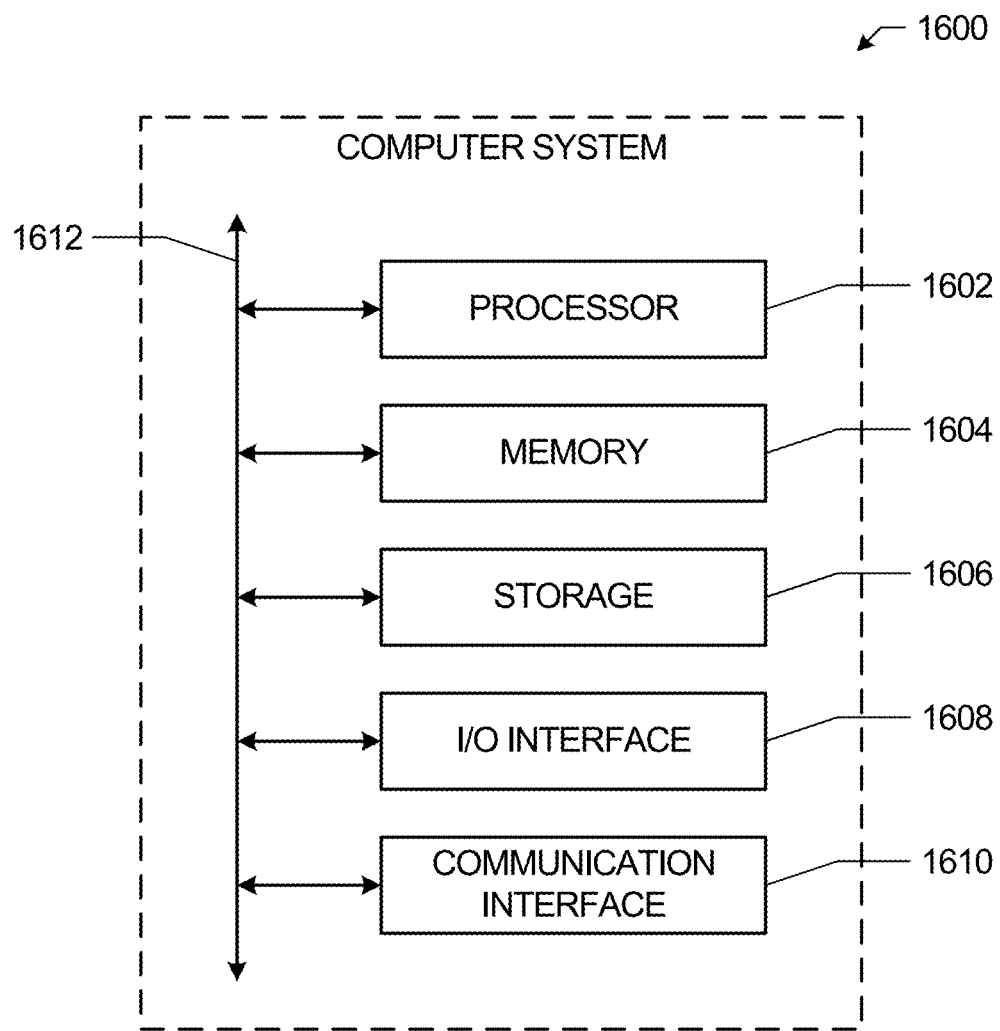
FIG. 16 illustrates an example computer system.

FIG. 16 illustrates an example computer system 1600. In particular embodiments, computer system 1600 may be utilized to perform heat deposition mapping in a cooking appliance through Fast Pattern Temperature Imaging (FPTI) and/or Adaptive Fast Pattern Temperature Imaging (AFPTI). In particular embodiments, one or more computer systems 1600 perform one or more steps of one or more methods described or illustrated herein. In particular embodiments, one or more computer systems 1600 provide functionality described or illustrated herein. In particular embodiments, software running on one or more computer systems 1600 performs one or more steps of one or more methods described or illustrated herein or provides functionality described or illustrated herein. Particular embodiments include one or more portions of one or more computer systems 1600. Herein, reference to a computer system may encompass a computing device, and vice versa, where appropriate. Moreover, reference to a computer system may encompass one or more computer systems, where appropriate.

This disclosure contemplates any suitable number of computer systems 1600. This disclosure contemplates computer system 1600 taking any suitable physical form. As example and not by way of limitation, computer system 1600 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1600 may include one or more computer systems 1600; be unitary or distributed; span multiple locations; span multiple machines; span multiple data centers; or reside in a cloud, which may include one or more cloud components in one or more networks.

Where appropriate, one or more computer systems 1600 may perform without substantial spatial or temporal limitation one or more steps of one or more methods described or illustrated herein. As an example, and not by way of limitation, one or more computer systems 1600 may perform in real time or in batch mode one or more steps of one or more methods described or illustrated herein. One or more computer systems 1600 may perform at different times or at different locations one or more steps of one or more methods described or illustrated herein, where appropriate.

In particular embodiments, computer system 1600 includes a processor 1602, memory 1604, storage 1606, an input/output (I/O) interface 1608, a communication interface 1610, and a bus 1612. Although this disclosure describes and illustrates a particular computer system having a particular number of particular components in a particular arrangement, this disclosure contemplates any suitable computer system having any suitable number of any suitable components in any suitable arrangement. In particular embodiments, processor 1602 includes hardware for executing instructions, such as those making up a computer program. As an example, and not by way of limitation, to execute instructions, processor 1602 may retrieve (or fetch) the instructions from an internal register, an internal cache, memory 1604, or storage 1606; decode and execute them; and then write one or more results to an internal register, an internal cache, memory 1604, or storage 1606. In particular embodiments, processor 1602 may include one or more internal caches for data, instructions, or addresses. This disclosure contemplates processor 1602 including any suitable number of any suitable internal caches, where appropriate. As an example, and not by way of limitation, processor 1602 may include one or more instruction caches, one or more data caches, and one or more translation lookaside buffers (TLBs). Instructions in the instruction caches may be copies of instructions in memory 1604 or storage 1606, and the instruction caches may speed up retrieval of those instructions by processor 1602.

Data in the data caches may be copies of data in memory 1604 or storage 1606 for instructions executing at processor 1602 to operate on; the results of previous instructions executed at processor 1602 for access by subsequent instructions executing at processor 1602 or for writing to memory 1604 or storage 1606; or other suitable data. The data caches may speed up read or write operations by processor 1602. The TLBs may speed up virtual-address translation for processor 1602. In particular embodiments, processor 1602 may include one or more internal registers for data, instructions, or addresses. This disclosure contemplates processor 1602 including any suitable number of any suitable internal registers, where appropriate. Where appropriate, processor 1602 may include one or more arithmetic logic units (ALUs); be a multi-core processor; or include one or more processors 1602. Although this disclosure describes and illustrates a particular processor, this disclosure contemplates any suitable processor.

In particular embodiments, memory 1604 includes main memory for storing instructions for processor 1602 to execute or data for processor 1602 to operate on. As an example, and not by way of limitation, computer system 1600 may load instructions from storage 1606 or another source (such as, for example, another computer system 1600) to memory 1604. Processor 1602 may then load the instructions from memory 1604 to an internal register or internal cache. To execute the instructions, processor 1602 may retrieve the instructions from the internal register or internal cache and decode them. During or after execution of the instructions, processor 1602 may write one or more results (which may be intermediate or final results) to the internal register or internal cache. Processor 1602 may then write one or more of those results to memory 1604. In particular embodiments, processor 1602 executes only instructions in one or more internal registers or internal caches or in memory 1604 (as opposed to storage 1606 or elsewhere) and operates only on data in one or more internal registers or internal caches or in memory 1604 (as opposed to storage 1606 or elsewhere).

One or more memory buses (which may each include an address bus and a data bus) may couple processor 1602 to memory 1604. Bus 1612 may include one or more memory buses, as described below. In particular embodiments, one or more memory management units (MMUs) reside between processor 1602 and memory 1604 and facilitate accesses to memory 1604 requested by processor 1602. In particular embodiments, memory 1604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1604 may include one or more memory devices 1604, where appropriate. Although this disclosure describes and illustrates particular memory, this disclosure contemplates any suitable memory.

In particular embodiments, storage 1606 includes mass storage for data or instructions. As an example, and not by way of limitation, storage 1606 may include a hard disk drive (HDD), a floppy disk drive, flash memory, an optical disc, a magneto-optical disc, magnetic tape, or a Universal Serial Bus (USB) drive or a combination of two or more of these. Storage 1606 may include removable or non-removable (or fixed) media, where appropriate. Storage 1606 may be internal or external to computer system 1600, where appropriate. In particular embodiments, storage 1606 is non-volatile, solid-state memory. In particular embodiments, storage 1606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1606 taking any suitable physical form. Storage 1606 may include one or more storage control units facilitating communication between processor 1602 and storage 1606, where appropriate. Where appropriate, storage 1606 may include one or more storages 1606. Although this disclosure describes and illustrates particular storage, this disclosure contemplates any suitable storage.

In particular embodiments, I/O interface 1608 includes hardware, software, or both, providing one or more interfaces for communication between computer system 1600 and one or more I/O devices. Computer system 1600 may include one or more of these I/O devices, where appropriate. One or more of these I/O devices may enable communication between a person and computer system 1600. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1606 for them. Where appropriate, I/O interface 1608 may include one or more device or software drivers enabling processor 1602 to drive one or more of these I/O devices. I/O interface 1608 may include one or more I/O interfaces 1606, where appropriate. Although this disclosure describes and illustrates a particular I/O interface, this disclosure contemplates any suitable I/O interface.

In particular embodiments, communication interface 1610 includes hardware, software, or both providing one or more interfaces for communication (such as, for example, packet-based communication) between computer system 1600 and one or more other computer systems 1600 or one or more networks. As an example, and not by way of limitation, communication interface 1610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1610 for it.

As an example, and not by way of limitation, computer system 1600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1600 may include any suitable communication interface 1610 for any of these networks, where appropriate. Communication interface 1610 may include one or more communication interfaces 1610, where appropriate. Although this disclosure describes and illustrates a particular communication interface, this disclosure contemplates any suitable communication interface.

In particular embodiments, bus 1612 includes hardware, software, or both coupling components of computer system 1600 to each other. As an example, and not by way of limitation, bus 1612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1612 may include one or more buses 1612, where appropriate. Although this disclosure describes and illustrates a particular bus, this disclosure contemplates any suitable bus or interconnect.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by an electromagnetic device:
   for each particular combination of a plurality of different combinations of variable control parameters of the electromagnetic device that control heating by the electromagnetic device:
      generating a first map $T_1$ of a temperature profile of a load disposed inside a cavity of the electromagnetic device;
      emitting electromagnetic radiation into the cavity, for a period of time, based on the particular combination of variable control parameters, wherein a subsequent temperature of the load resulting from the emission is measured by one or more sensors;
      generating a subsequent map $T_2$ of a temperature profile of the load after emitting the electromagnetic radiation; and
      determining a spatially-dependent, time-dependent heating map of the load due to the particular combination of control parameters by subtracting the first map $T_1$ from the second map $T_2$ and averaging the result over the period of time;
   storing each of the spatially dependent, time-dependent heating maps of the load in association with the respective particular combination of variable control parameters of the plurality of different combinations of variable control parameters;
   determining a current temperature of the load;
   determining a target temperature of the load; and
   determining, based on the stored spatially dependent, time-dependent heating maps, the target temperature of the load, and the current temperature of the load, (1) a particular sequence of variable control-parameter combinations, and (2) for each variable control-parameter combination in the sequence, a corresponding amount of time to apply the each variable control-parameter combination in the sequence to automatically achieve the target temperature of the load.

2. The method of claim 1, further comprising:
determining the particular sequence of variable control-parameter combinations and corresponding amounts of time based on a target spatial heating rate of the load.

3. The method of claim 2, further comprising:
in response to achieving the target temperature of the load, suspending emission of electromagnetic radiation into the cavity.

4. The method of claim 1, further comprising:
determining an ambient temperature within the cavity;
wherein the stored spatially dependent, time-dependent heating maps further comprise an indication of an ambient heating rate or cooling rate within the cavity of the electromagnetic device.

5. The method of claim 1, wherein the period of time is based at least on an observed temperature rise of the load.

6. The method of claim 1, further comprising:
determining an ambient temperature within the cavity;
determining a spatially dependent cooling rate within the load disposed inside the cavity based on the ambient temperature within the cavity;
adjusting one or more of the spatially-dependent, time-dependent heating maps based on the spatially dependent cooling rate within the cavity of the load.

7. The method of claim 1, wherein the variable control parameters comprises one or more of a radiation frequency, a radiation amplitude, a radiation phase, a radiation phase shift, a load rotation, a load translation, or a mode stirrer configuration.

8. An electromagnetic device comprising:
one or more emitters;
one or more non-transitory computer-readable storage media including instructions; and
one or more processors coupled to the one or more emitters and the one or more storage media, the one or more processors configured to execute the instructions to:
for each particular combination of a plurality of different combinations of variable control parameters of the electromagnetic device that control heating by the electromagnetic device:
generate a first map $T_1$ of a temperature profile of a load disposed inside a cavity of the electromagnetic device;
emit electromagnetic radiation into the cavity, for a period of time, based on the particular combination of variable control parameters, wherein a subsequent temperature of the load resulting from the emission is measured by one or more sensors;
generate a subsequent map $T_2$ of a temperature profile of the load after emitting the electromagnetic radiation; and
determine a spatially-dependent, time-dependent heating map of the load due to the particular combination of control parameters by subtracting the first map $T_1$ from the second map $T_2$ and averaging the result over the period of time;
store each of the spatially dependent, time-dependent heating maps of the load in association with the respective particular combination of variable control parameters of the plurality of different combinations of variable control parameters;
determine a current temperature of the load;
determine a target temperature of the load; and
determine, based on the stored spatially dependent, time-dependent heating maps, the target temperature of the load, and the current temperature of the load, (1) a particular sequence of variable control-parameter combinations, and (2) for each variable control-parameter combination in the sequence, a corresponding amount of time to apply the each variable control-parameter combination in the sequence to automatically achieve the target temperature of the load.

9. The electromagnetic device of claim 8, wherein the processors are further configured to execute instructions to:
determine the particular sequence of variable control-parameter combinations and corresponding amounts of time based on a target spatial heating rate of the load.

10. The electromagnetic device of claim 9, wherein the processors are further configured to execute instructions to:
in response to achieving the target temperature of the load, suspend emission of electromagnetic radiation into the cavity.

11. The electromagnetic device of claim 8, wherein the processors are further configured to execute instructions to:
determine an ambient temperature within the cavity;
wherein the stored spatially dependent, time-dependent heating maps further comprise an indication of an ambient heating rate or cooling rate within the cavity of the electromagnetic device.

12. The electromagnetic device of claim 8, wherein the period of time is based at least on an observed temperature rise of the load.

13. The electromagnetic device of claim 8, wherein the processors are further configured to execute instructions to:
determine an ambient temperature within the cavity
determine a spatially dependent cooling rate within the load disposed inside the cavity based on the ambient temperature within the cavity;
adjust one or more of the spatially-dependent, time-dependent heating maps based on the spatially dependent cooling rate within the cavity of the load.

14. The electromagnetic device of claim 8, wherein the variable control parameters comprises one or more of a radiation frequency, a radiation amplitude, a radiation phase, a radiation phase shift, a load rotation, a load translation, or a mode stirrer configuration.

15. A non-transitory computer-readable medium comprising instructions that, when executed by one or more processors of an electromagnetic device, cause the one or more processors to:
for each particular combination of a plurality of different combinations of variable control parameters of the electromagnetic device that control heating by the electromagnetic device:
generate a first map $T_1$ of a temperature profile of a load disposed inside a cavity of the electromagnetic device;
emit electromagnetic radiation into the cavity, for a period of time, based on the particular combination of variable control parameters, wherein a subsequent temperature of the load resulting from the emission is measured by one or more sensors;
generate a subsequent map $T_2$ of a temperature profile of the load after emitting the electromagnetic radiation; and
determine a spatially-dependent, time-dependent heating map of the load due to the particular combination of control parameters by subtracting the first map $T_1$ from the second map $T_2$ and averaging the result over the period of time;
store each of the spatially dependent, time-dependent heating maps of the load in association with the respective particular combination of variable control parameters of the plurality of different combinations of variable control parameters;

determine a current temperature of the load;

determine a target temperature of the load; and determine, based on the stored spatially dependent, time-dependent heating maps, the target temperature of the load, and the current temperature of the load, (1) a particular sequence of variable control-parameter combinations, and (2) for each variable control-parameter combination in the sequence, a corresponding amount of time to apply the each variable control-parameter combination in the sequence to automatically achieve the target temperature of the load.

16. The non-transitory computer-readable medium of claim 15, wherein the instructions further comprises instructions to:

determine the particular sequence of variable control-parameter combinations and corresponding amounts of time based on a target spatial heating rate of the load.

17. The non-transitory computer-readable medium of claim 16, wherein the instructions further comprises instructions to:

in response to achieving the target temperature of the load, suspend emission of electromagnetic radiation into the cavity.

18. The non-transitory computer-readable medium of claim 15, wherein the instructions further comprises instructions to:

determine an ambient temperature within the cavity; wherein the stored spatially dependent, time-dependent heating maps further comprise an indication of an ambient heating rate or cooling rate within the cavity of the electromagnetic device.

19. The non-transitory computer-readable medium of claim 15, wherein the period of time is based at least on an observed temperature rise of the load.

20. The non-transitory computer-readable medium of claim 15, wherein the instructions further comprises instructions to:

determine an ambient temperature within the cavity;

determine a spatially dependent cooling rate within the load disposed inside the cavity based on the ambient temperature within the cavity;

adjust one or more of the spatially-dependent, time-dependent heating maps based on the spatially dependent cooling rate within the cavity of the load.

\* \* \* \* \*